US009174186B2

(12) United States Patent
Cao et al.

(10) Patent No.: US 9,174,186 B2
(45) Date of Patent: Nov. 3, 2015

(54) SUPERCRYSTALLINE COLLOIDAL PARTICLES AND METHOD OF PRODUCTION

(75) Inventors: Y. Charles Cao, Gainesville, FL (US); Jiaqi Zhuang, Gainesville, FL (US); Huimeng Wu, Gainesville, FL (US); Yongan Yang, Golden, CO (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 952 days.

(21) Appl. No.: 12/672,447

(22) PCT Filed: Aug. 15, 2008

(86) PCT No.: PCT/US2008/073295
§ 371 (c)(1),
(2), (4) Date: Mar. 4, 2011

(87) PCT Pub. No.: WO2009/026141
PCT Pub. Date: Feb. 26, 2009

(65) Prior Publication Data
US 2011/0150938 A1  Jun. 23, 2011

Related U.S. Application Data

(60) Provisional application No. 60/956,625, filed on Aug. 17, 2007.

(51) Int. Cl.
B01J 13/00 (2006.01)
A61K 9/16 (2006.01)
A61K 47/02 (2006.01)

(52) U.S. Cl.
CPC .......... B01J 13/0026 (2013.01); B01J 13/0043 (2013.01)

(58) Field of Classification Search
None
See application file for complete search history.

(56) References Cited

U.S. PATENT DOCUMENTS

| 6,924,116 | B2 * | 8/2005 | Tan et al. | 435/7.21 |
| 7,066,978 | B2 * | 6/2006 | Waki et al. | 75/348 |
| 7,225,082 | B1 | 5/2007 | Natan et al. | |
| 2005/0176863 | A1 | 8/2005 | Yokota et al. | |
| 2006/0019427 | A1 * | 1/2006 | Cao | 438/95 |
| 2006/0122596 | A1 * | 6/2006 | Dubrow | 606/60 |
| 2006/0133990 | A1 * | 6/2006 | Hyeon et al. | 423/622 |

FOREIGN PATENT DOCUMENTS

JP    15260862    9/2003

OTHER PUBLICATIONS

Shevchenko et al., "Structural diversity in binary nanoparticle superlattices", Jan. 5, 2006, Nature, vol. 439, pp. 55-59.*

Wang et al., "Template-directed colloidal self-assembly—the route to 'top-down' nanochemical engineering", 2004, Journal of Materials Chemistry, vol. 14, pp. 459-468.*
Alivisatos, A.P."Semiconductor Clusters, Nanocrystals, and Quantum Dots", Science, Feb. 16, 1996, pp. 933-937, vol. 271, No. 5251.
Banin, U. et al. "Identification of atomic-like electronic states in indium arsenide nanocrystal quantum dots", Nature, Aug. 5, 1999, pp. 542-544, vol. 400.
Boal, A.K. et al . "Self-assembly of nanoparticles into structured spherical and network aggregates", Nature, Apr. 13, 2000, pp. 746-748, vol. 404.
Collier, C.P. et al. "Reversible Tuning of Silver Quantum Dot Monolayers Through the Metal-Insulator Transition", Science, Sep. 26, 1997, pp. 1978-1981, vol. 277, No. 5334.
Courty, A. et al. "Vibrational coherence of self-organized silver nanocrystals in f.c.c. supra-crystals", Nature Mater., May 2005, pp. 395-398, vol. 4.
Han, M. et al."Quantum-dot-tagged microbeads for multiplexed optical coding of biomolecules", Nature Biotechnol., Jul. 2001, pp. 631-635, vol. 19.
Hussain, I. et al. "Formation of Spherical Nanostructures by the Controlled Aggregation of Gold Colloids", Langmuir, 2006, pp. 2938-2941, vol. 22.
Iskandar, F. et al. "Control of the morphology of nanostructured particles prepared by the spray drying of a nanoparticle sol", J. Colloid Interface Sci., 2003, pp. 296-303, vol. 265.
Kalsin, A.M. et al. "Controlling the Growth of "Ionic" Nanoparticle Supracrystals", Nano Lett., 2007, pp. 1018-1021, vol. 7, No. 4.
Kalsin, A.M. et al. "Electrostatic Self-Assembly of Binary Nanoparticle Crystals with a Diamond-Like Lattice", Science, 2006, pp. 420-424, vol. 312.
Kiely, C.J. et al. "Spontaneous ordering of bimodal ensembles of nanoscopic gold clusters", Nature, Dec. 3, 1998, pp. 444-446, vol. 396.
Maye, M.M. et al. "Mediator-Template Assembly of Nanoparticles", J. Am. Chem. Soc., 2005, pp. 1519-1529, vol. 127.
Mirkin, C.A. et al. "A DNA-based method for rationally assembling nanoparticles into macroscopic materials", Nature, Aug. 15, 1996, pp. 607-609, vol. 382.
Murray, C.B. et al. "Self-Organization of CdSe Nanocrystallites into Three-Dimensional Quantum Dot Superlattices", Science, Nov. 24, 1995, pp. 1335-1338, vol. 270, No. 5240.
Ozbay, E. et al. "Plasmonics: Merging Photonics and Electronics at Nanoscale Dimensions", Science, 2006, pp. 189-193, vol. 311.
Rabani, E. et al. "Drying-mediated self-assembly of nanoparticles", Nature, Nov. 20, 2003, pp. 271-274, vol. 426.
Saunders, A.E. et al. "Observation of an AB Phase in Bidisperse Nanocrystal Superlattices", ChemPhysChem, 2005, pp. 61-65, vol. 6.
Shevchenko, E.V. et al. "Structural diversity in binary nanoparticles superlattices", Nature, Jan. 5, 2006, pp. 55-59, vol. 439.
Sonnichsen, C. et al. "A molecular ruler based on Plasmon coupling of single gold and silver nanoparticles", Nature Biotechnol., Jun. 2005, pp. 741-745, vol. 23, No. 6.

(Continued)

Primary Examiner — Michael B Pallay
(74) Attorney, Agent, or Firm — Saliwanchik, Lloyd & Eisenschenk

(57) ABSTRACT

The present invention concerns size- and shape-controlled, colloidal superparticles (SPs) and methods for synthesizing the same. Ligand-functionalized nanoparticles such as non-polar-solvent-dispersible nanoparticles, are used, and the solvophobic interactions can be controlled. Advantageously, supercrystalline SPs having a superlattice structure, such as a face-centered cubic structure, can be produced. Further, the methods of the invention can provide SPs that self-assemble and are monodisperse. The SPs can be doped with organic dyes and further assembled into more complex structures.

32 Claims, 19 Drawing Sheets

(56) References Cited

OTHER PUBLICATIONS

Sun, S. et al. "Monodisperse FePt Nanoparticles and Ferromagnetic FePt Nanocrystal Superlattices", *Science*, Mar. 17, 2000, pp. 1989-1992, vol. 287.

Van Duyne, R.P. "Molecular Plasmonics", *Science*, Nov. 5, 2004, pp. 985-986, vol. 306.

Velev, O.D. "Self-Assembly of Unusual Nanoparticles Crystals", *Science*, Apr. 21, 2006, pp. 376-377, vol. 312.

Xu, H. et al. "Development of High Magnetization $Fe_3O_4$/Polystyrene/Silica Nanospheres via Combined Miniemulsion/Emulsion Polymerization", *J. Am. Chem. Soc.*, 2006, pp. 15582-15583, vol. 128.

Yu, D. et al. "n-Type Conducting CdSe Nanocrystals Solids", *Science*, May 23, 2003, pp. 1277-1280, vol. 300.

Somorjai, G.A. et al., "Fabrication of Two-Dimensional and Three-Dimensional Platinum Nanoclusters to Serve as High Technology Catalysts-Catalysts Capable of 100% Reaction Selectivity" in *Clusters and Nano-Assemblies*, Jena, P. et al., Eds., World Scientific Publishing, New Jersey, 2005, pp. 97-125.

Murray, C. et al. "Synthesis and characterization of monodisperse nanocrystals and close-packed nanocrystal assemblies" *Annu. Rev. Mater. Sci.*, 2000, 30:545-610.

Wang, T. et al. "Self-assembled colloidal superparticles from nanorods" *Science*, 2012, 338:358-363.

Yin, Y. and Alivisatos, A.P. "Colloidal nanocrystal synthesis and the organic—inorganic interface" *Nature*, 2005, 437:664-670.

Zhuang, J. et al. "Controlling colloidal superparticle growth through solvophobic interactions" *Angew. Chem. Int. Ed.*, 2008, 47:2208-2212.

Zhuang, J. et al. "Supercrystalline Colloidal Particles from Artificial Atoms" *J. Am. Chem. Soc.*, 2007, 129:14166-14167.

* cited by examiner

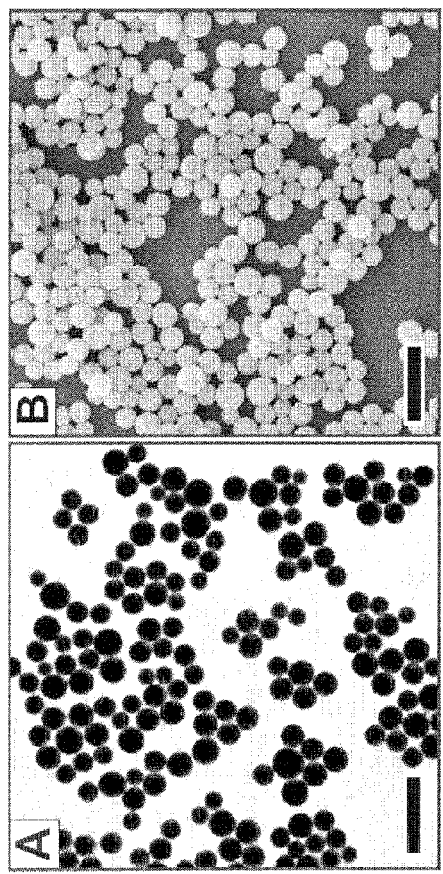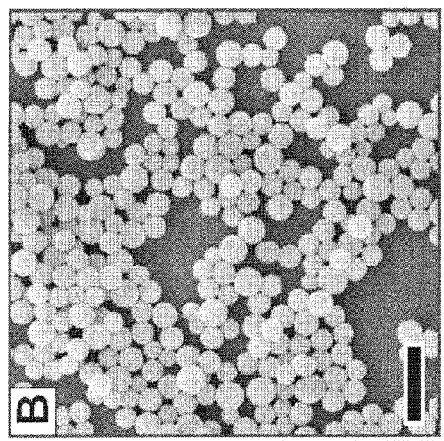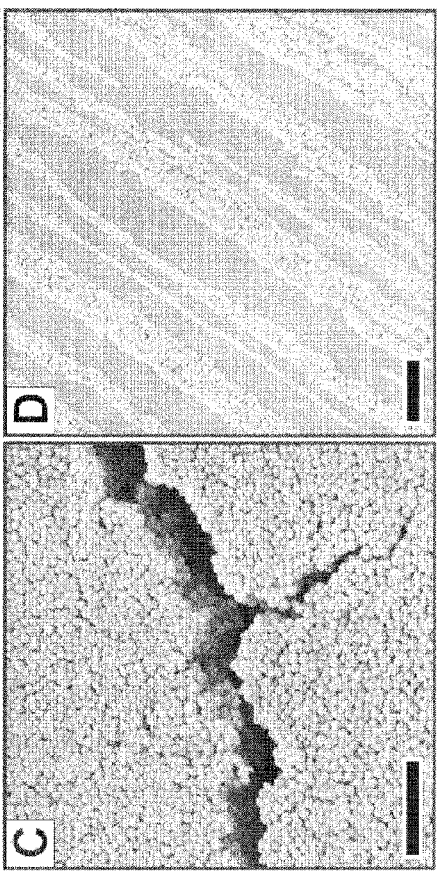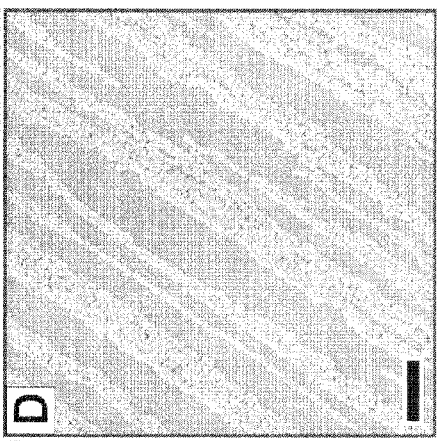

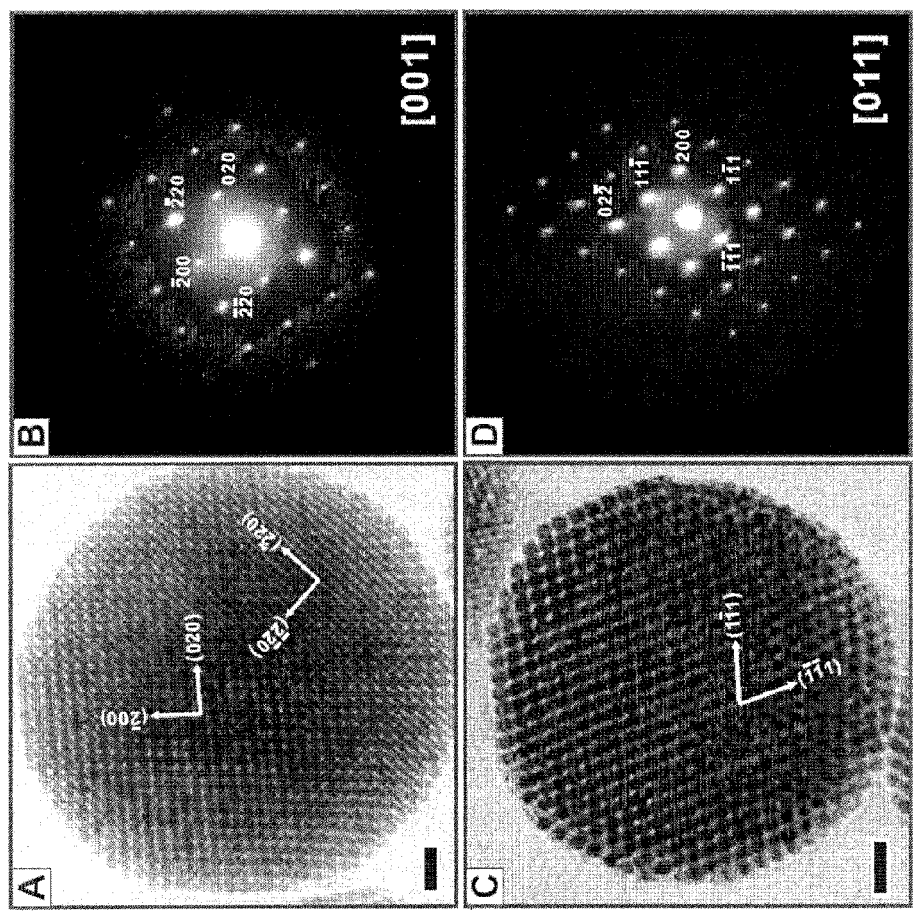

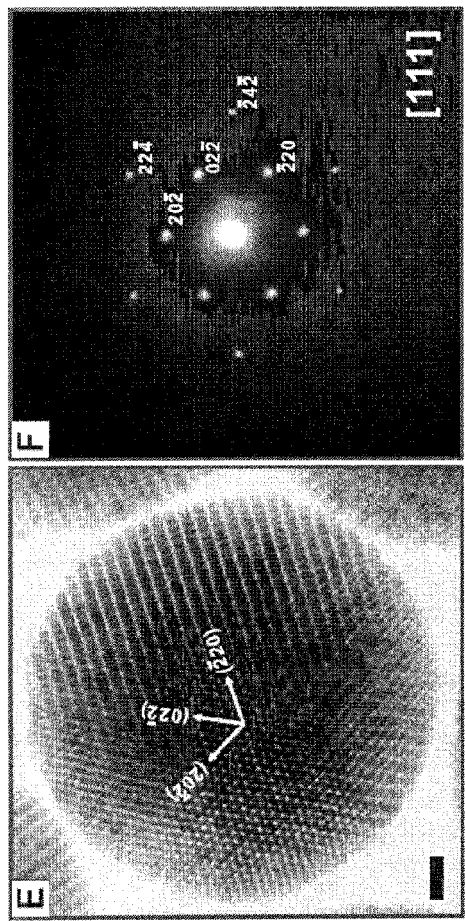
FIG. 2E
FIG. 2F
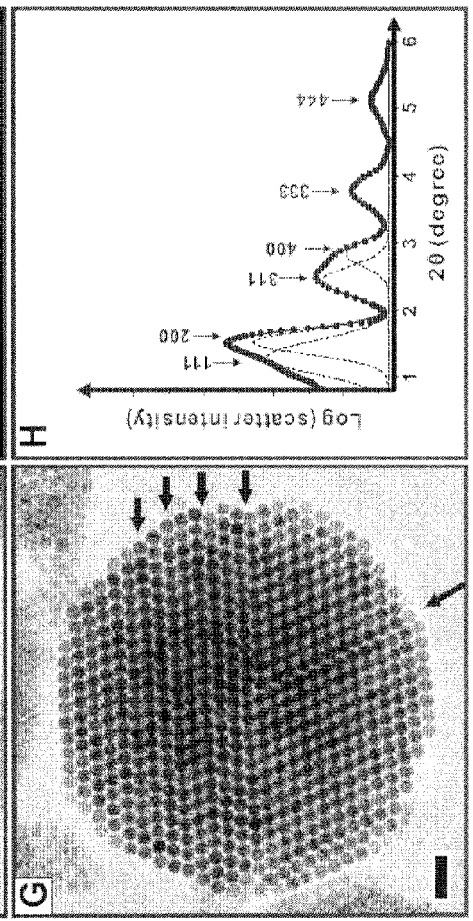
FIG. 2G
FIG. 2H

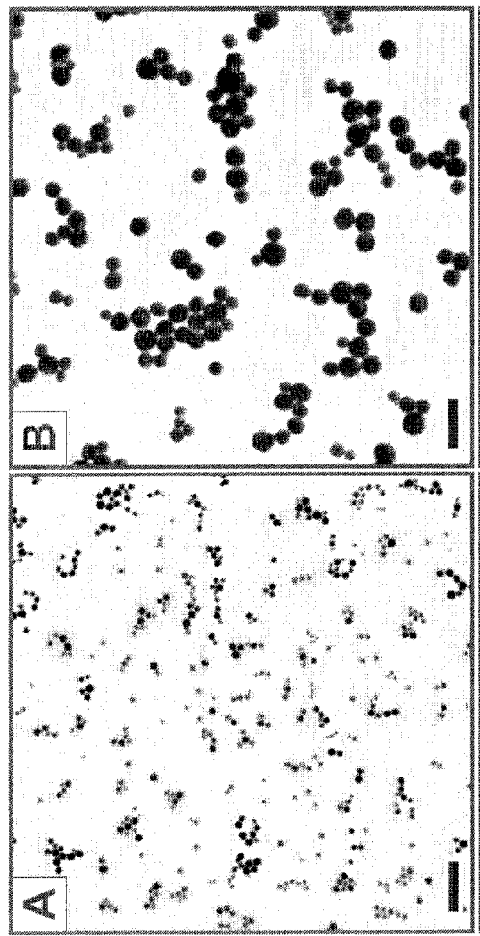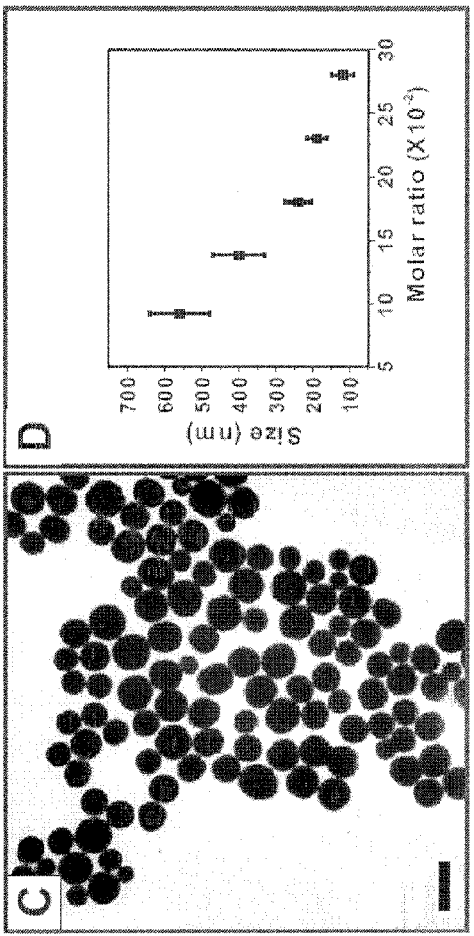
FIG. 4A  FIG. 4B  FIG. 4C  FIG. 4D

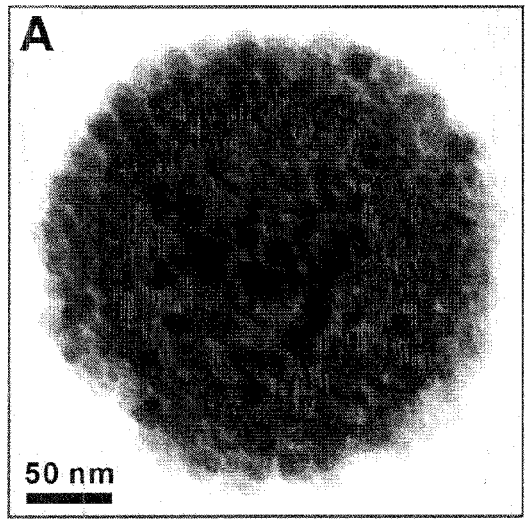
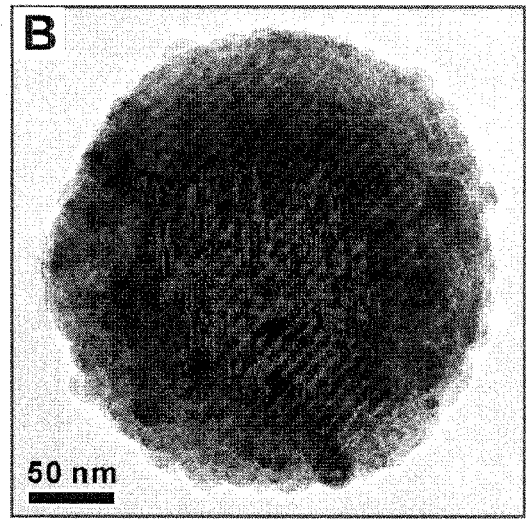
FIG. 12A   FIG. 12B
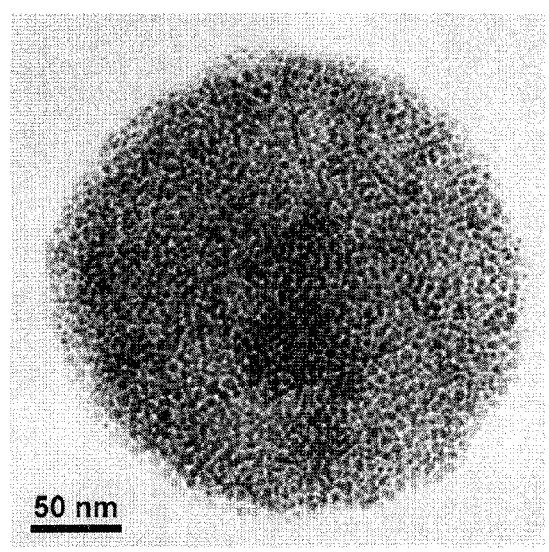
FIG. 13

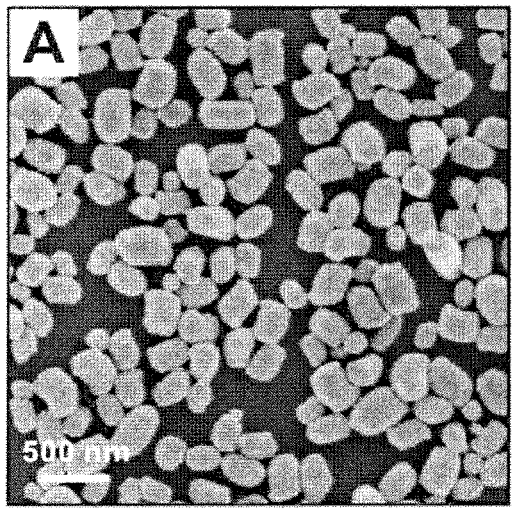
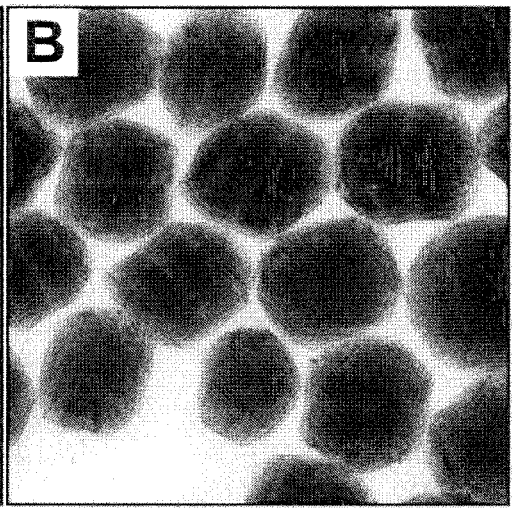
FIG. 16A  FIG. 16B
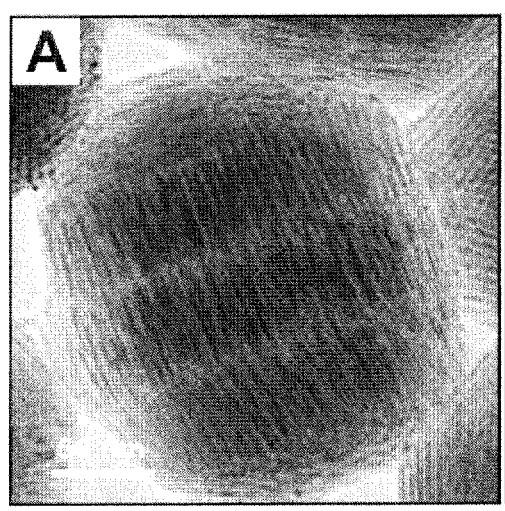
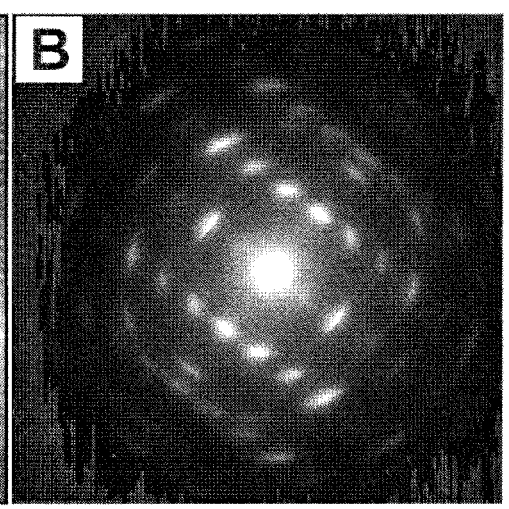
FIG. 17A  FIG. 17B

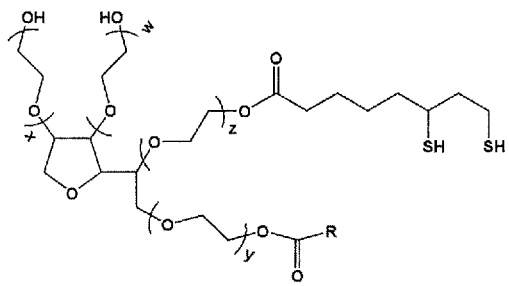 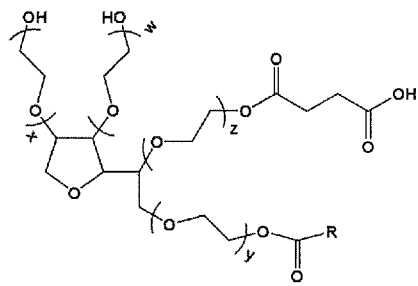
Tween-20-SH
Tween-20-COOH
x+y+z+w=20, R=$C_{11}H_{23}$
FIG. 20A FIG. 20B
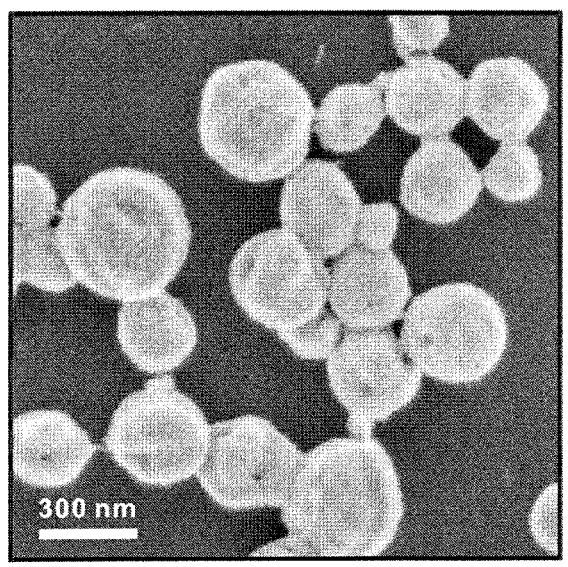
FIG. 21

SUPERCRYSTALLINE COLLOIDAL PARTICLES AND METHOD OF PRODUCTION

GOVERNMENT SUPPORT

The subject matter of this application has been supported by research grants from the National Science Foundation under grant number DMR-0645520 and the Office of Naval Research under grant number N00014-06-1-0911. Accordingly, the government has certain rights in this invention.

CROSS-REFERENCE TO RELATED APPLICATIONS

The present application is the National Stage of International Application Number PCT/US2008/073295, filed Aug. 15, 2008, which claims the benefit of U.S. Provisional Application Ser. No. 60/956,625, filed Aug. 17, 2007, each of which is hereby incorporated by reference herein in its entirety, including any figures, tables, nucleic acid sequences, amino acid sequences, and drawings.

BACKGROUND OF THE INVENTION

Nanoparticles are microscopic particles that are less than 100 nanometers (nm) in at least one dimension. They are often referred to as "artificial atoms" because of their unique physical properties that allow them to behave similar to atoms (Alivisatos, A. P., *Science*, 1996, 271:933; Banin, U. et al., *Nature*, 1999, 400:542; Yu, D. et al., *Science*, 2003, 300:1277). The ability to assemble nanoparticles into desired nanoscopic architectures, such as nanoparticle superlattices, may result in a new way to fabricate functional materials of interest for a wide variety of practical applications, including biomedical diagnosis (Mirkin, C. A. et al., *Nature*, 1996, 382:607; Han, M. et al., *Nature Biotechnol.*, 2001, 19:631; Sonnichsen, C. et al., *Nature Biotechnol.*, 2005, 23:741), catalysis (Somorjai, G. A. et al., in *Clusters and Nano-Assemblies*, Jena, P. et al., Eds., World Scientific Publishing, New Jersey, 2005, pp. 97-125), plasmonics (Ozbay, E., *Science*, 2006, 311:189; Van Duyne, R. P., *Science*, 2004, 306:985), and high-density data storage (Sun, S. et al., *Science*, 2000, 287:1989).

Molecular self-assembly is the assembly of molecules without guidance or management from an outside source. Self-assembly often refers to the ability of molecules to form supramolecular assemblies. A simple example is the formation of a micelle by surfactant molecules in solution. Many biological systems use self-assembly to assemble various molecules and structures. Imitating these strategies and creating novel molecules with the ability to self-assemble into supramolecular assemblies is an important technique in nanotechnology. In self-assembly, the final structure is often "encoded" in the shape and properties of the molecules that are used, as compared to traditional techniques, such as lithography, in which the desired final structure must be effectively "carved out" from a larger block of matter. Self-assembly is thus referred to as a "bottom-up" manufacturing technique, as compared to lithography being a "top-down" technique.

Current methods for the assembly of nanoparticle superlattices have been based on controlling driving forces such as hard-sphere entropic depletion, electrostatic forces, and van der Waals, steric, and dipolar interparticle interactions (Rabani, E. et al., *Nature*, 2003, 426:271; Velev, O. D., *Science*, 2006, 312:376). These methods have led to the preparation of nanoparticle thin films and colloidal crystals with a variety of superlattice structures (Velev, O. D., *Science*, 2006, 312:376; Kiely, C. J. et al., *Nature*, 1998, 396:444; Murray, C. B. et al., *Science*, 1995, 270:1335; Saunders, A. E. and Kirgel, B. A., *ChemPhysChem*, 2005, 6:61; Shevchenko, E. V. et al., *Nature*, 2006, 439:55; Kalsin, A. M. et al., *Science*, 2006, 312:420), from which new collective properties have been discovered (Collier, C. P. et al., *Science*, 1997, 277:1978; Courty, A. et al., *Nature Mater.*, 2005, 4:395). However, size- and shape-controlled nanoparticle superlattices have yet to be synthesized. These supercrystalline "superparticles" made of artificial atoms would be very useful in many industries.

Typical approaches for attempting to control the size and shape of nanoparticle assemblies include spray drying (Iskandar, F. et al., *J. Colloid Interface* 2003, 265:296), emulsion polymerization (Xu, H. et al., *J. Am. Chem. Soc.*, 2006, 128:15582), mediator-induced assembly (Boal, A. K. et al., *Nature*, 2000, 404:746; Elussain, I. et al., *Langmuir*, 2006, 22:2938; Maye, M. M. et al., *J. Am. Chem. Soc.*, 2005, 127:1519), and Debye screening (Kalsin, A. M. and Grzybowski, B. A., *Nano Lett.*, 2007, 7:1018). Nanoparticle assemblies made by these existing approaches are susceptible to problems, such as poor size-distributions, poor shape-distributions, and a lack of long-range ordering (Iskandar, F. et al., *J. Colloid Interface Sci.*, 2003, 265:296; Xu, H. et al., *J. Am. Chem. Soc.*, 2006, 128:15582; Boal, A. K. et al., *Nature*, 2000, 404:746; Hussain, I. et al., *Langmuir*, 2006, 22:2938; Maye, M. M. et al., *J. Am. Chem. Soc.*, 2005, 127:1519; Kalsin, A. M. and Grzybowski, B. A., *Nano Lett.*, 2007, 7:1018).

Thus, it would be advantageous to have available a method of synthesizing nanoparticle assemblies that permits efficient control of size- and shape-distributions and long-range ordering.

BRIEF SUMMARY OF THE INVENTION

The present invention concerns colloidal "superparticles" (SPs) and a method of synthesizing the same from nanoparticles (also referred to as artificial atoms), such as nonpolar-solvent-dispersible nanoparticles. In one aspect, the invention provides a colloidal SP, comprising an aggregate of nanoparticles (e.g., particles of less than about 100 nanometers), wherein adjacent nanoparticles are bound together through non-covalent interactions. In one embodiment, the SPs are supercrystalline (having a superlattice structure), such as a face-centered cubic (fcc) superlattice structure. The SPs can comprise one or more types of nanoparticles (i.e., homosystems or heterosystems/composites). The invention also provides films and other compositions comprising the SPs.

Preferably, superparticles of the invention are supercrystalline collections of nanoparticles in the form of particles. A superparticle can comprise hundreds or thousands of nanoparticle building blocks (or artificial atoms), which are bound together through non-covalent interactions. In contrast, inside of a nanoparticle are hundreds or thousands of atoms, which are bound together through covalent or ionic interactions. Because non-covalent interactions are much weaker than covalent or ionic interactions, the superparticles of the invention can be reversibly decomposed back into the form of free, monodispersed nanoparticles under some conditions. For example, addition of an excess amount of oleic acid can cause $Fe_3O_4$ superparticles to decompose into $Fe_3O_4$ nanoparticles. In contrast, nanoparticles are much more stable because the covalent or ionic interaction is a very strong interaction between atoms. The deformation of nanoparticles is normally not reversible. Because the deformation of superparticles is reversible, superparticles of the invention can be used as drug delivery vehicles that can be degraded in vivo.

Superparticles of the invention can be of similar size to micron or sub-micron particles (0.02 to 1 micron in diameter). However, in contrast to similar micron or sub-micron particles, supercrystalline superparticles of the invention are collections of particles or nanoparticles in the form of particles (i.e., particles made of particles). Such other micron or sub-micron particles (0.02 to 1 micron in diameter) are directly made of atoms through covalent or ionic interactions, containing no superlattice structures.

In one embodiment, a method of the invention for synthesizing colloidal SPs comprises mixing a first solution comprising ligand-functionalized nanoparticles with a surfactant under aqueous conditions to form a second solution comprising nanoparticle-micelles; mixing the second solution with a solvent to form a third solution comprising colloidal SPs. In one embodiment, the solvent is a polar organic solvent (e.g., ethylene glycol, di-ethylene glyocol, tri-ethylene glycol, diethanolamine, triethanolamine, and/or an oxygen-containing organic solvent) and/or an oxygen-containing solvent. The SPs can be crystallized to form superlattices within the SPs. In addition, the SPs can be isolated from the third solution. Crystallization can be carried out, for example, by heating the third solution to temperature and for a period of time sufficient to result in crystallization and formation of superlattices within the SPs. Isolation of the SP can be carried out, for example, by allowing the third solution to cool and centrifuging the third solution to precipitate colloidal SPs. Optionally, the synthesis is achieved through self-assembly.

A major driving force for superparticle formation is the solvophobic interaction between the nanoparticles (also referred to herein as (nanoparticle) precursors or building blocks) and the solution to which the nanoparticle-micelle solution can be added (also referred to herein as the growth solution). Fine-tuning this interaction can provide a size-controlled synthesis of superparticles. The single supercrystalline structure of these superparticles can be formed in an additional crystallization stage during the synthesis. In certain embodiments, superparticles can be synthesized from $Fe_3O_4$, CdSe, or Au nanoparticles at different sizes.

The properties of these superparticles can be altered by doping (e.g., with organic dyes). For example, rhodamine-6G-doped gold superparticles exhibit strong surface-enhanced Raman scattering signals. Doped superparticles can be produced by using doped nanoparticles, or by including a dye outside of the nanoparticles such as rhodamine-6G (see FIGS. 5C and 5D).

Furthermore, the superparticles of the invention can be assembled into more complex structures. The method of synthesis of the invention can yield monodisperse superparticles.

The superparticles of the invention can be used as drug delivery agents in vitro, ex vivo, or in vivo. The superparticles of the invention can be used in the production of solar cells (e.g., as backbones of solar cells). For example, superparticles containing mixtures of two or more types of nanoparticles can be used to form close-packed films to absorb light and create charge separation. The superparticles of the invention can be used to make batteries, e.g., to facilitate charge transfer. The superparticles of the invention can be used to make crystal-based light emitting diodes (LEDs), e.g., creating emitting centers.

The superparticles of the invention can be used as a colored sensitizer in the form of an ink or dye to label products and vehicles in commerce or for military applications (e.g., functioning as a "bar code"), for example. Superparticles can be utilized that fluoresce or otherwise react in a detectable way to certain ambient or applied conditions such as various wavelengths of light. For example, superparticles comprising cadmium selenide nanoparticles that fluoresce under certain wavelengths of light can be utilized (FIG. 5B).

BRIEF DESCRIPTION OF THE DRAWINGS

FIG. 1A shows a transmission electron microscopy (TEM) image of superparticles with a diameter of about 190 nm. The scale bar is 500 nm. FIG. 1B shows a scanning electron microscopy (SEM) image of superparticles with a diameter of about 190 nm. The scale bar is 500 nm. FIG. 1C shows an SEM image of multi-layered assemblies of superparticles (a close-packed superparticle film). The scale bar is 2 microns. FIG. 1D shows an SEM image of superparticle assembly under an external magnetic field. The scale bar is 2 microns.

FIG. 2A shows a TEM image of a superparticle viewed along the [001] zone axis. The scale bar is 20 nm. FIG. 2B shows a selected area electron diffraction (SAED) pattern taken from the superparticle of FIG. 2A. FIG. 2C shows a TEM image of a superparticle viewed along the [011] zone axis. The scale bar is 20 nm. FIG. 2D shows an SAED pattern taken from the superparticle of FIG. 2C. FIG. 2E shows a TEM image of a superparticle viewed along the [111] zone axis. The scale bar is 20 nm. FIG. 2F shows an SAED pattern taken from the superparticle of FIG. 2E. FIG. 2G is a TEM image of a superparticle with stacking faults marked as arrows. The scale bar is 20 nm. FIG. 2H is a small-angle x-ray diffraction (XRD) pattern of a sample with superparticles having a diameter of about 560 nm.

FIG. 4A shows a TEM image of superparticles with a diameter of about 120 nm and a standard deviation of about 19%. The scale bar is 1 micron. FIG. 4B shows superparticles with a diameter of about 400 nm and a standard deviation of about 17%. The scale bar is 1 micron. FIG. 4C shows superparticles with a diameter of about 560 nm and a standard deviation of about 15%. The scale bar is 1 micron. FIG. 4D shows a plot of superparticle size as a function of the molar ratio between a DTAB surfactant and $Fe_3O_4$ nanoparticles with a diameter of about 5.8 nm.

FIGS. 12A-12B show TEM images of superparticles with $Fe_3O_4$ nanoparticles of two different sizes. FIG. 12A shows a superparticle with 5.8-nm and 8.9-nm $Fe_3O_4$ nanoparticles at a molar ratio of 1:1 and FIG. 12B shows a superparticle with 5.8-nm and 8.9-nm $Fe_3O_4$ nanoparticles at a molar ratio of 10:1.

FIG. 13 shows a TEM image of superparticles made of 5.8-nm $Fe_3O_4$ nanoparticles and 5.4-nm gold nanoparticle at a molar ratio of 1:1.

FIG. 16A is a SEM image of stacked superparticles made with 55-nm CdSe/CdS nanorods in high rods concentration. FIG. 16B is a TEM image of these stacked superparticles FIG. 17A is a TEM image showing the stacked structure of one superparticle. FIG. 17B is the electron diffraction pattern taken from this superparticle along the [$2\bar{1}\bar{1}0$] zone axis. The pattern shows single crystal-like dot patterns which means the nanorods in the superparticle are perfectly aligned at the atomic level.

FIGS. 20A and 20B show the molecular structure of two kinds of Tween-20 derivatives. The detailed synthesis procedures of these polymer ligands can be found in literature (Wu et al. *Angew. Chem. Int. Ed.,* 2008, 47:3730).

FIG. 21 is a TEM image of superparticles made with a mixture of 100-nm and 55-nm-long nanorods.

DETAILED DESCRIPTION OF THE INVENTION

Figures 3A, 3B, 3C, 3D, 3E, 3F:
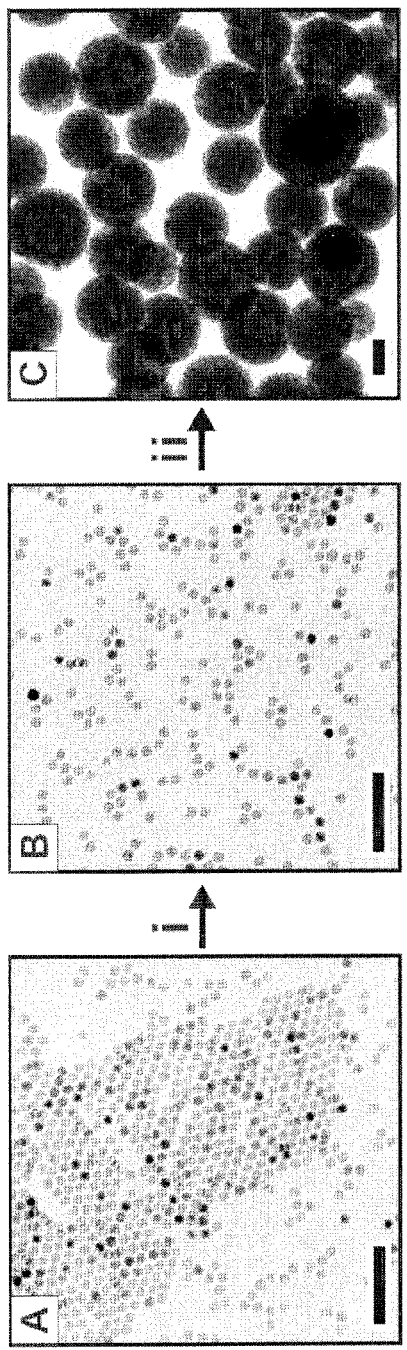
FIG. 3A shows a TEM image of oleic-acid-functionalized $Fe_3O_4$ nanoparticles. The scale bar is 50 nm.
FIG. 3B shows a TEM image of dodecyltrimethylammonium bromide (DTAB) $Fe_3O_4$ nanoparticle-micelles. The scale bar is 50 nm.
FIG. 3C shows a TEM image of superparticles made according to an embodiment of the present invention. The scale bar is 100 nm.
FIG. 3D shows a TEM image of superparticles made according to an embodiment of the present invention. The scale bar is 100 nm.
FIG. 3E shows a zoomed-in image of the inset in FIG. 3D. The scale bar is 100 nm.
FIG. 3F shows a TEM image of superparticles after annealing at 80° C. for 6 hours. The scale bar is 100 nm.

The present invention provides colloidal superparticles (SPs) and a method for synthesizing SPs from nanoparticles, such as nonpolar-solvent-dispersible nanoparticles. Advantageously, solvophobic interactions can be used to control the size and shape of the SPs. SPs can be produced in any shape, including but not limited to, rod-shaped, cube-shaped, sphere-shaped, or prism-shaped. For example, SPs can be produced such that they are spherical and have narrow size-distributions (monodisperse). Advantageously, the SPs can exhibit a nearly perfect superlattice structure with nanometer-scale lattice spacing, which is dependant on the size of nanoparticles and their surface ligands. For example, superparticles comprising oleic-acid-capped $Fe_3O_4$ nanoparticles (5.8±0.3 nm in diameter) have been synthesized which possess a lattice constant of 11.7±0.2 nm. In this structure, the spacing of nanoparticles is about 1 nm.

Water-soluble nanoparticle-micelles can be used as precursors or building blocks for the synthesis of colloidal SPs, which may be supercrystalline. In one embodiment, a solution of nanoparticles can be mixed with a surfactant to form a nanoparticle-micelle solution. For example, the surfactant can be dodecyltrimethylammonium bromide (DTAB). Additionally, the nanoparticles can be provided in a chloroform solution.

The nanoparticle precursors can have any reasonable size and composition known to those skilled in the art. There is no size or shape limitation for the nanoparticle precursors that may be utilized. Nanoparticles can be, for example, spherical, rod, cube, plate, or prism shaped. Thus, nanoparticles of the invention can be nanospheres, nanorods, etc. Nanoparticles used to synthesize SPs of the invention can be composed of a variety of materials. For example, the nanoparticles can be semiconductor nanoparticles, alloy semiconductor nanoparticles, core-shell semiconductor nanoparticles, doped semiconductor nanoparticles, metal nanoparticles, metal oxide nanoparticles, or a combination of two or more of the foregoing. Semiconductor nanoparticles can comprise CdSe, CdS, CdTe, ZnS, ZnSe, ZnTe, HgS, HgSe, HgTe, PbS, PbSe, PbTe, InAs, InP, GaP, GaAs, FeS, CuS, $Ag_2S$, and/or MnS. Alloy semiconductor nanoparticles can comprise CdZnS, CdZnSe, CdZnTe CdHgS, CdHgSe, CdHgTe, ZnSSe, CdSSe, HgSSe, CdSeTe, HgSeTe, InGaAs, and/or InGaP. Core-shell semiconductor nanoparticles can comprise CdS/ZnS, CdSe/ZnS, CdSe/CdS, CdSe/CdS/ZnS, PbSe/PbS, InAs/InP, InP/ZnS, and/or InP/CdS. Doped semiconductor nanoparticles can comprise Mn-doped ZnSe, Mn-doped CdS/ZnS, Mn-doped ZnSe/ZnS, and/or In-doped CdSe/ZnS. Metal nanoparticles can comprise Au, Ag, Cu, Pt, Cr, Pd, Fe, Co, Ni, Ru, W, Pt/Fe, Pt/Ni, Pt/Co, Ag/Au, and/or Cu/Ag. Metal oxide nanoparticles can comprise $Fe_2O_3$, $Fe_3O_4$, $FeMnO_3$, $Fe_2MnO_3$, NiO, MnO, $TiO_2$, $ZrO_2$, $MoO_3$, $WO_3$, $V_2O_5$, $CrO_3$, ZnO, $Al_2O_3$, $Ga_2O_3$, $In_2O_3$, SnO, $SiO_2$, $GeO_2$, and/or rare earth oxides ($Gd_2O_3$, $UO_2$). These nanoparticles can be synthesized through injection or non-injection based synthesis, for example (Yin, Y. and Alivisatos, A. P. *Nature*, 2005, 437:664-670; Yang, Y. A. et al. *Angew. Chem., Int. Ed.*, 2005, 44:6712-6715).

In an embodiment, the nanoparticles can be $Fe_3O_4$ nanoparticles. In a further embodiment, the nanoparticles can be oleic-acid-functionalized $Fe_3O_4$ nanoparticles. In another embodiment, the nanoparticles can be CdSe nanoparticles. In a still further embodiment, the nanoparticles can be $TiO_2$ or $SnO_2$ nanoparticles. In another embodiment, the nanoparticles can be gold (Au) nanoparticles. The nanoparticles can comprise combinations of materials, such as combinations of $Fe_3O_4$, CdSe, and/or Au.

The resulting nanoparticle-micelle solution can be injected, under vigorous stirring, into another solution, such as a poly(vinyl pyrrolidone) (PVP) ethylene glycol solution. Then, the resulting solution can be heated, cooled, and centrifuged to precipitate colloidal SPs. In one embodiment, the solution can be heated to a temperature of at least 50° C. for at least 30 minutes. In another embodiment, the solution can be heated to a temperature of about 80° C. for at least 1 hour. In an embodiment, after heating, the mixture solution can be cooled to a temperature of less than about 35° C. In a further embodiment, after heating, the mixture solution can be cooled to a temperature of about 25° C.

The resulting colloidal SPs are highly dispersible in polar solvents such as ethanol and water. In an embodiment, the colloidal SPs can be re-dispersed in a polar solvent and centrifuged again. This process can be repeated to further purify the SPs.

Figure 6:
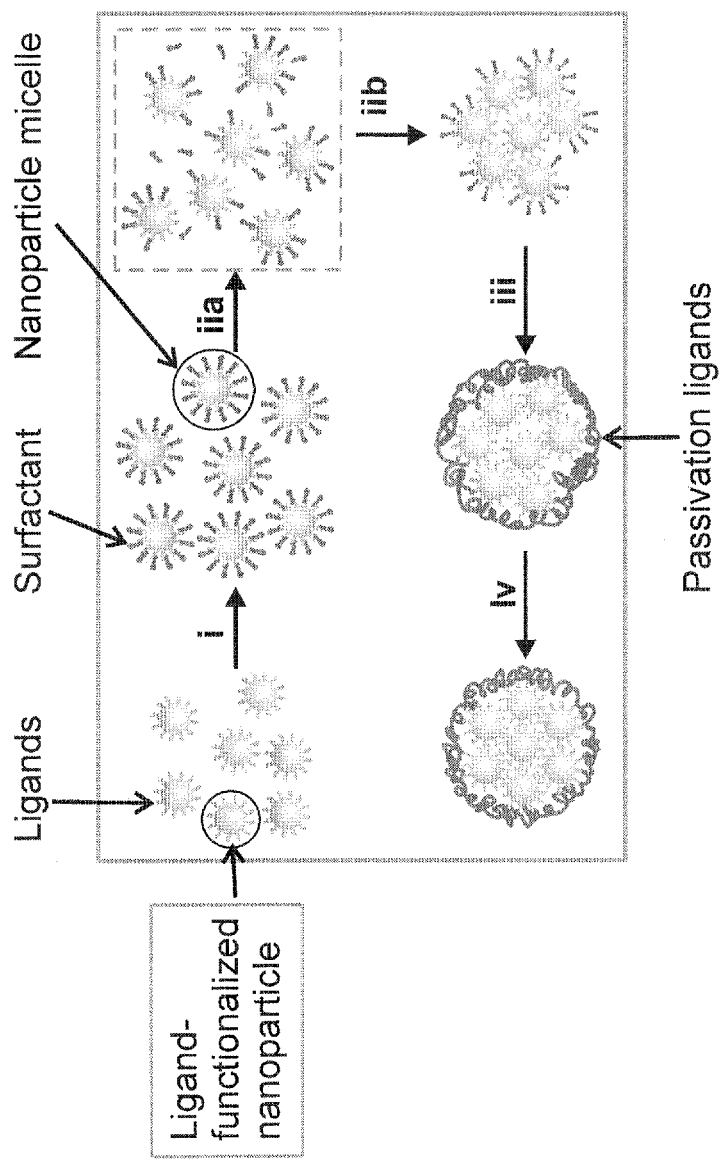
FIG. 6 shows a scheme of superparticle synthesis according to an embodiment of the present invention.
Figure 7A:
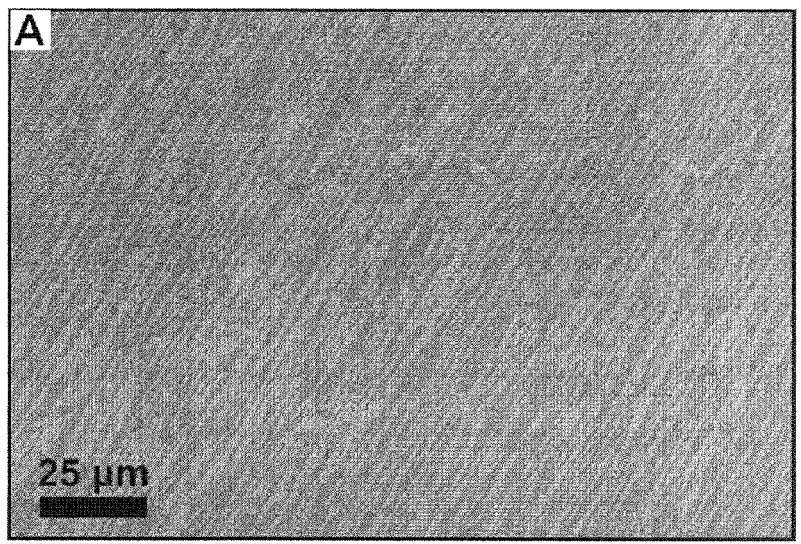
FIGS. 7A-7C show SEM images of an assembly of $Fe_3O_4$ superparticles under an external magnetic field.
Figure 7B:
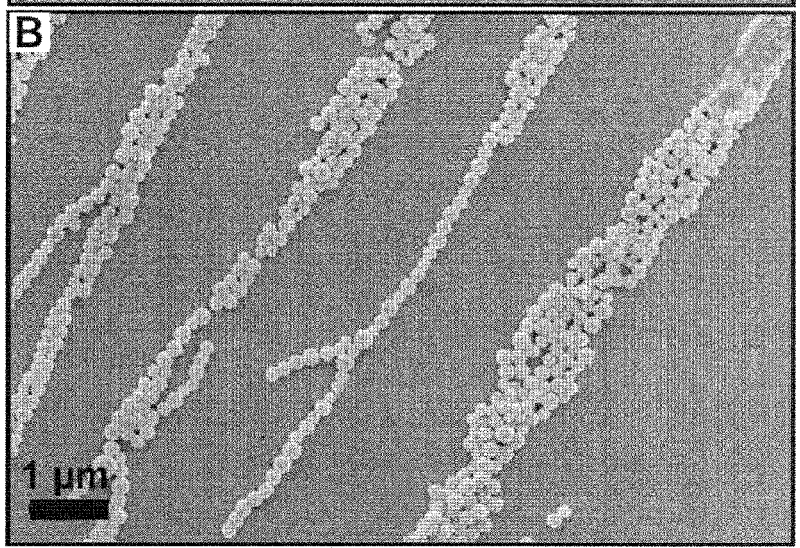
Figure 7C:
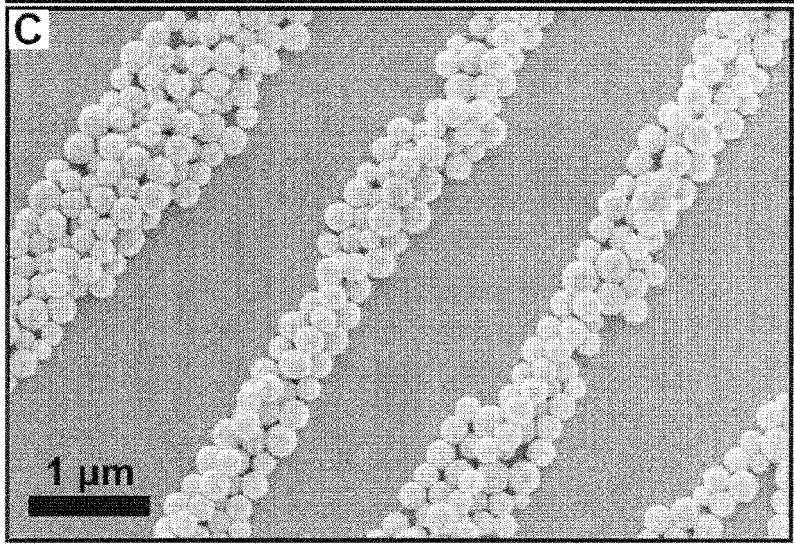
Figure 8A:
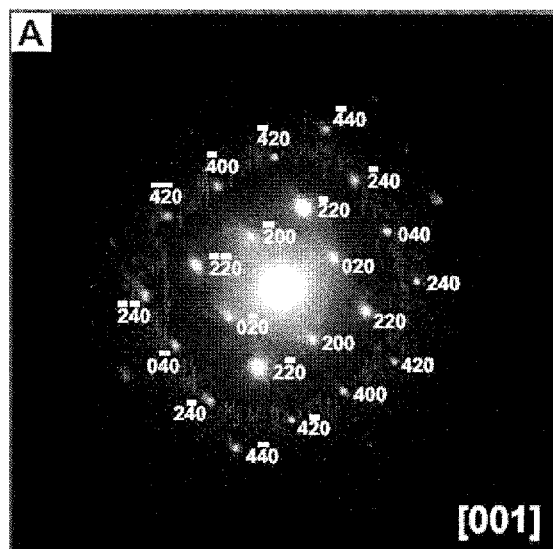
FIG. 8A shows an SAED pattern of $Fe_3O_4$ superparticles at a [001] zone.
Figure 8B:
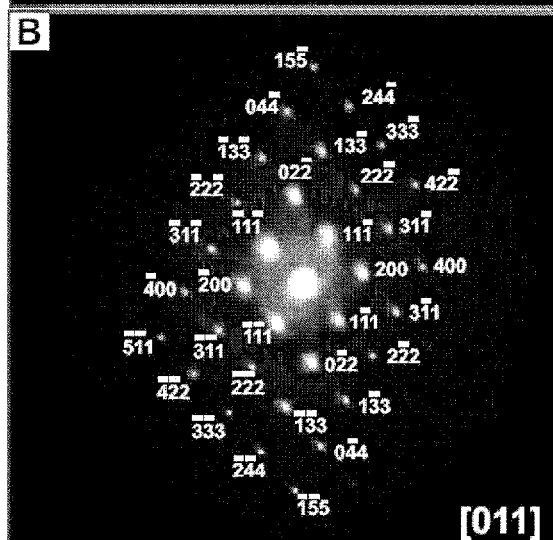
FIG. 8B shows an SAED pattern of $Fe_3O_4$ superparticles at the [011] zone.
Figure 8C:
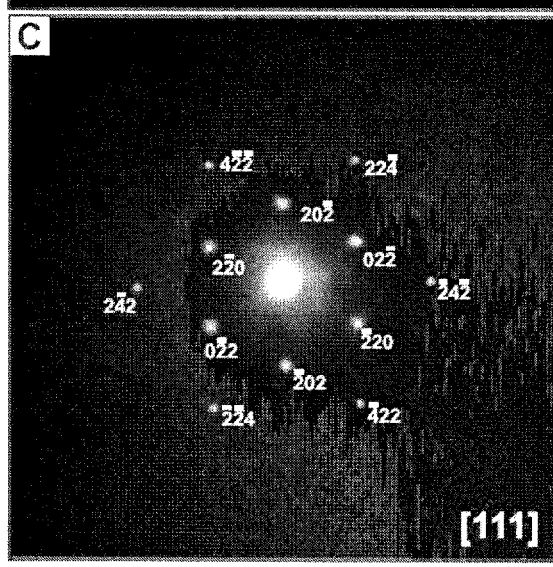
FIG. 8C shows an SAED pattern of $Fe_3O_4$ superparticles at the [111] zone.

Preferably, the synthesis is achieved through self-assembly of the nanoparticles into the colloidal SPs. Referring to FIG. 6, the general steps for making SPs include (1) particle-micelle formation, (2) aggregation, (3) passivation, and (4) crystallization.

Preferably, the superparticles of the invention possess a superlattice structure. In one embodiment, the superlattice structure of superpartcles is a face-centered cubic (fcc) structure. However, structures other than the fcc structure are also possible. The lattice constant of the superlattice is dependant on the size of the nanoparticle(s) and their surface ligands. The parameters for four types of superparticles described in the Examples will now be described. For superparticles made of oleic-acid-capped $Fe_3O_4$ nanoparticles (5.8±0.3 nm in diameter), their face-centered cubic (fcc) superlattice structure has a lattice constant of 11.7±0.2 nm. In this structure, the spacing of nanoparticles was about 1 nm. For superparticles made of oleic-acid-capped $Fe_3O_4$ nanoparticles (8.9±0.4 nm in diameter), their face-centered cubic (fcc) superlattice structure has a lattice constant of 16.6±0.3 nm. In this structure, the spacing of nanoparticles was about 0.7 nm. For superparticles made of oleic-acid-capped CdSe nanoparticles (6.3±0.3 nm in diameter), their face-centered cubic (fcc) surperlattice structure has a lattice constant of 12.2±0.2 nm. In this structure, the spacing of nanoparticles was about 0.7 nm. For superparticles made of oleic-acid-capped Au nanoparticles (5.4±0.3 nm in diameter), their face-centered cubic (fcc) surperlattice structure has a lattice constant of 10.7±0.2 nm. In this structure, the spacing of nanoparticles was about 0.8 nm.

Referring to FIGS. 1A and 1B, transmission electron microscope (TEM) and scanning electron microscope (SEM) images illustrate that the SPs can be about 190 nm in diameter with a standard deviation (a) of about 15%. FIG. 1C shows that these colloidal particles can be assembled into multi-layered, close-packed particle solids. In addition, referring to FIG. 1B and FIGS. 7A-7C, these particles can be superparamagnetic, and thus can be further assembled into parallel-line-like structures under an external magnetic field. The spacing between the particle lines is due to repulsion between in-plane dipole moments induced by the external magnetic field (h., T. et al., *Adv. Mater.*, 2001, 13:1253).

As demonstrated in FIGS. 2A-2F, the supercrystalline structure of the colloidal SPs can be determined by TEM and small-angle electron diffraction (SAED) studies. TEM shows that these particles can exhibit on-axis superlattice-fringe patterns that are related to a face-centered cubic (fcc) superlattice structure with a lattice constant of 11.7±0.2 nm. The [001] image in FIG. 2A shows the perpendicular cross-fringes projected from the $\{200\}_{SL}$ and $\{220\}_{SL}$ planes of the superlattice, respectively. Referring to FIG. 2C, the cross-fringes in the [011] projection image can exhibit an angle of about 70.5°). This is close to a theoretically expected value of 70.53° between the $(\bar{1}\bar{1}1)_{SL}$ and $(1\bar{1}1)_{SL}$ planes (McKie, D. and McKie, C. *Crystalline Solids*, John Wiley & Sons, New York, 1974). The [111] projection image in FIG. 2E shows the characteristic hexagonal cross-fringes with an inter-dot spacing of about 4.7 nm). This inter-dot spacing is much smaller than the size of the artificial atom building blocks (e.g. 5.8-nm for $Fe_3O_4$ nanoparticles), and it is related to the spacing of about 4.1 nm between the {022} planes in the superlattice. Additionally, the spacing of the $\{022\}_{SL}$ planes can be calculated using the inter-dot spacing of 4.7 nm as: $d_{022}=4.7\times\sin(60°)=4.07$ nm. This calculated value is very close to the spacing ($d_{022}=4.1$ nm) directly measured from the TEM image. This indicates that the superlatticefringes can provide superlattice-spacing information for the nanoparticle artificial atoms and may not be direct images of them (Williams, D. B. and Carter, C. B. *Transmission Electron Microscopy*, Plenum Press, New York, 1996). Thus, the origin of these superlattice-fringes may be from electron phase contrast due to the interference among the incident beam and small-angle diffraction beams through these supercrystalline SPs (Williams, D. B. and Carter, C. B. *Transmission Electron Microscopy*, Plenum Press, New York, 1996). The interplanar spacing and angles obtained from the TEM images are consistent with the corresponding SAED patterns. Referring to FIGS. 2B, 2D, and 2F and FIGS. 8A-8C, these patterns show sharp-spot arrays, which are single-crystal-like ED patterns (Wang, Z. L. *Elastic and Inelastic Scattering in Electron Diffraction and Imaging*, Plenum Press, New York, 1995), demonstrating the three-dimensional (3D) near-perfection of the superlattice (Murray, C. B. et al., *Science*, 1995, 270:1335). Taken together, these results indicate that the colloidal SPs have a "single supercrystalline" structure.

Similar to those single crystalline nanocrystals made of atoms (Peng, X. et al., *J. Am. Chem. Soc.*, 1997, 119:7019), the single supercrystalline SPs also exhibit stacking faults (a class of defects in crystals). Referring to FIG. 2G, TEM images show that these particles can have stacking faults along the $(111)_{SL}$ planes of the fcc superlattice. In addition, the fcc superlattice structure was further confirmed by small-angle X-ray diffraction (XRD). Referring to FIG. 2H, the XRD spectrum of a sample with larger supercrystalline SPs (560 nm in diameter) exhibits 6 distinguishable peaks. These peaks are located at the positions corresponding to the Bragg reflections from planes specified by the Miller indices as (111), (200), (311), (400), (333), and (444) of the fcc superlattice, respectively. The lattice constant determined from this XRD spectrum is about 11.9±0.3 nm, which is close to the value of about 11.7±0.2 nm from TEM measurements.

Figures 9A, 9B:
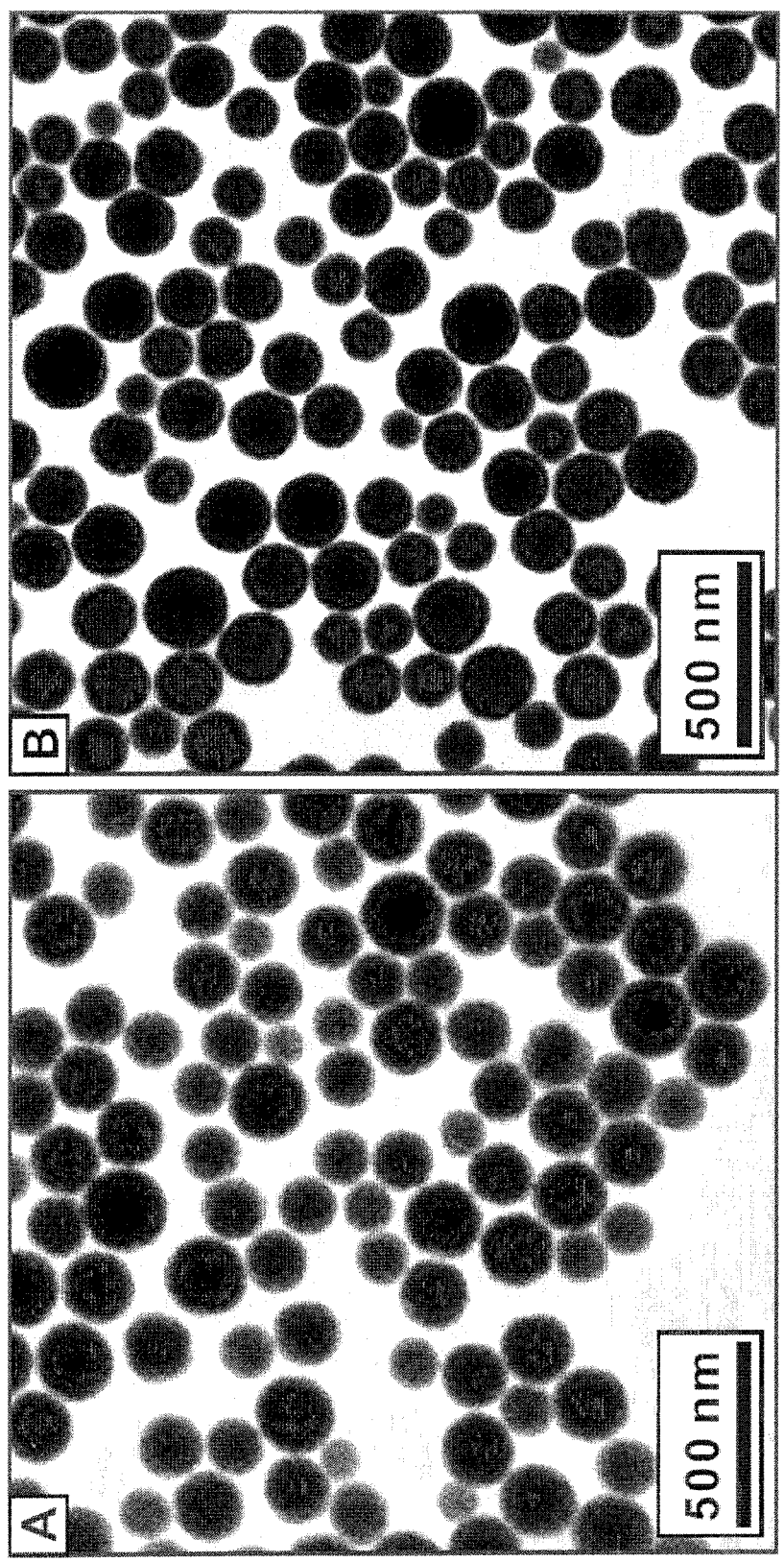
FIG. 9A shows a TEM image of $Fe_3O_4$ superparticles from aliquots taken at 1 minute after a nanoparticle-micelle injection in a synthesis according to an embodiment of the present invention.
FIG. 9B shows a TEM image of $Fe_3O_4$ superparticles from aliquots taken 1 minute after a nanoparticle-micelle injection in a synthesis according to an embodiment of the present invention.

Referring to FIGS. 3A-3F and the scheme in FIG. 6, in many embodiments, the synthesis of supercrystalline colloidal SPs occurs in four major stages: (i) nanoparticle-micelle formation, (ii) aggregation, (iii) passivation, and (iv) crystallization. The TEM results in FIGS. 3A and 3B show that nanoparticle-micelles can be monodispersed with a nearly identical size to their nonpolar-solvent-dispersible precursors. The formation of nanoparticle-micelles can be driven by hydrophobic van der Waals interactions between a hydrocarbon chain of nanoparticle ligands (such as oleic acid) and a hydrocarbon chain of the surfactant, for example DTAB (Fan, H. et al., *Science,* 2004, 304:567). After a nanoparticle-micelle solution is injected into another solution, such as ethylene glycol, the van der Waals interactions between nanoparticle ligands and surfactants can be weakened (Butt, H. J. et al., *Physics and Chemistry of Interfaces,* Wiley, Weinheim, 2006). Then, nanoparticle-micelles can decompose due to the loss of surfactant molecules in the solution (FIG. 6). As a result, a solvophobic interaction can be induced between nanoparticle ligands and the solution (Zhu, M. Q. et al., *J. Am. Chem. Soc.,* 2004, 126:2656), thereby leading to nanoparticle aggregation and the formation of SPs, as shown in FIG. 3C. Surprisingly, the SP formation is a very rapid process. Referring to FIGS. 9A and 9B, TEM studies show that nearly all the nanoparticles can grow into SPs within 1 minute after the injection of nanoparticle-micelles. and the size of the SPs did not change much. In addition, the repulsive solvophobic interaction is likely the reason that the SPs adopted a spherical shape, in which they can have the minimum surface energy (Butt, H. J. et al., *Physics and Chemistry of Interfaces,* Wiley, Weinheim, 2006). Moreover, the addition of the solution has no substantial effect on the size of the SPs, supporting the premise that solvophobic interactions are the major driving force behind the formation of SPs.

Figure 10B:
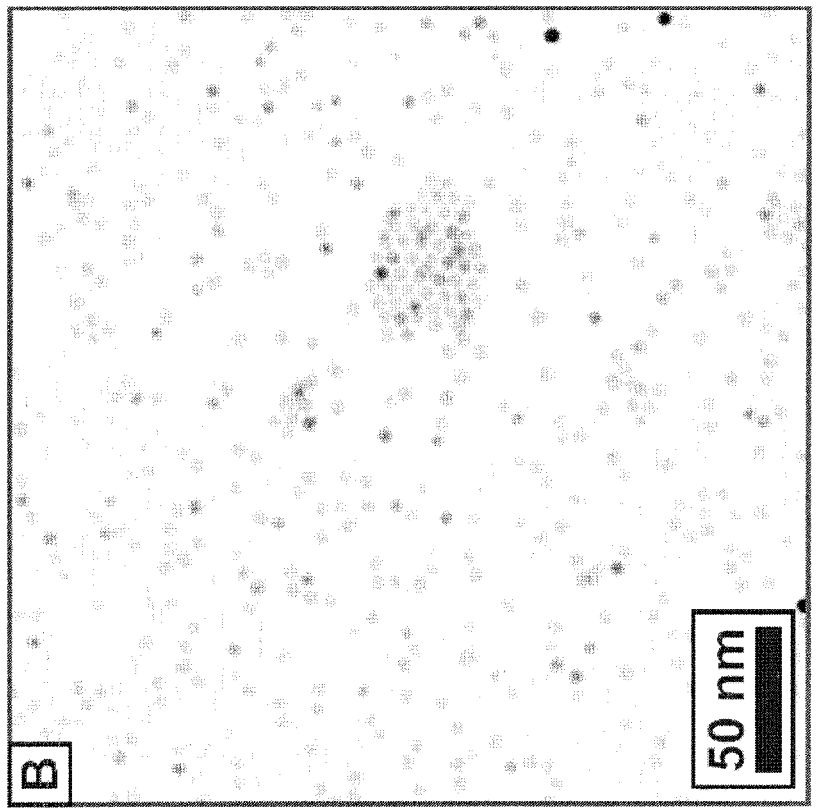
FIG. 10B shows a TEM image of $Fe_3O_4$ nanoparticles following a synthesis according to an embodiment of the present invention.
Figure 10A:
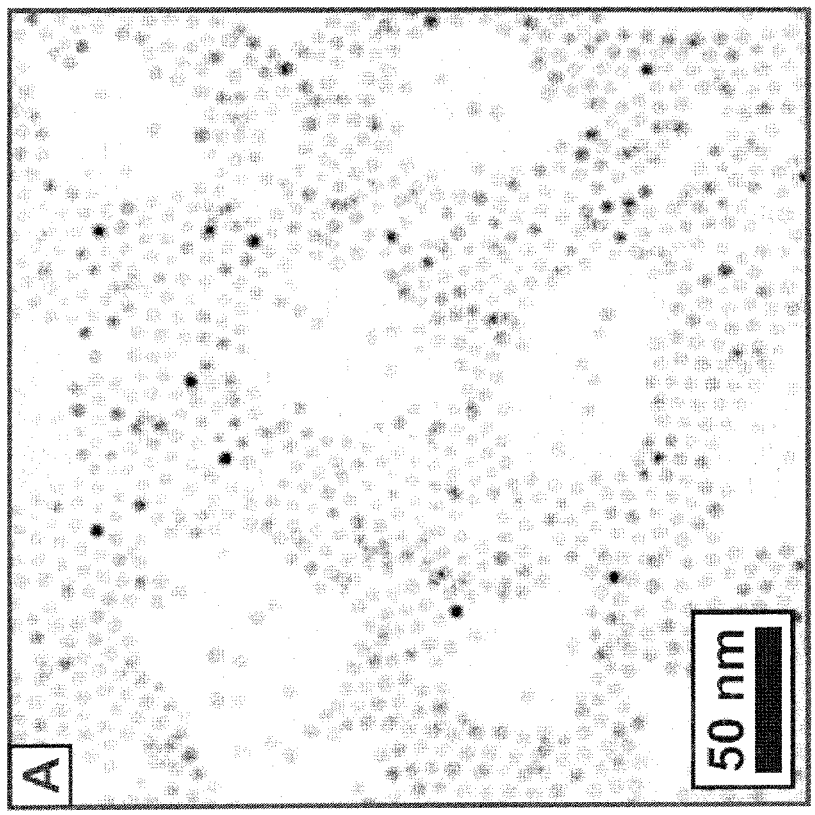
FIG. 10A shows a TEM image of $Fe_3O_4$ nanoparticle-micelles made with cetyltrimethylammonium (CTAB).

Further supporting the premise that the solvophobic interaction is important for the nanoparticle aggregation, surfactants that give nanoparticle-micelles that are very stable in solution do not aggregate. For example, using cetyltrimethylammonium bromide (CAB) as a surfactant for making $Fe_3O_4$ nanoparticle-micelles, as described in Example 6 below, results in nanoparticle-micelles that are more stable than those made of DTAB because CTAB has a lower solubility in ethylene glycol and a stronger van der Waals interaction with the nanoparticle ligands (such as oleic acid) than DTAB (Butt, H. J. et al., *Physics and Chemistry of Interfaces,* Wiley, Weinheim, 2006). Therefore, no sufficient solvophobic interaction can be induced between the nanoparticle ligands and ethylene glycol. Referring to FIGS. 10A and 10B, TEM shows that CTAB nanoparticle-micelles remained nearly unchanged in ethylene glycol even at 80° C. for 6 hours, and no spherical nanoparticle assembly was formed.

Figure 11A:
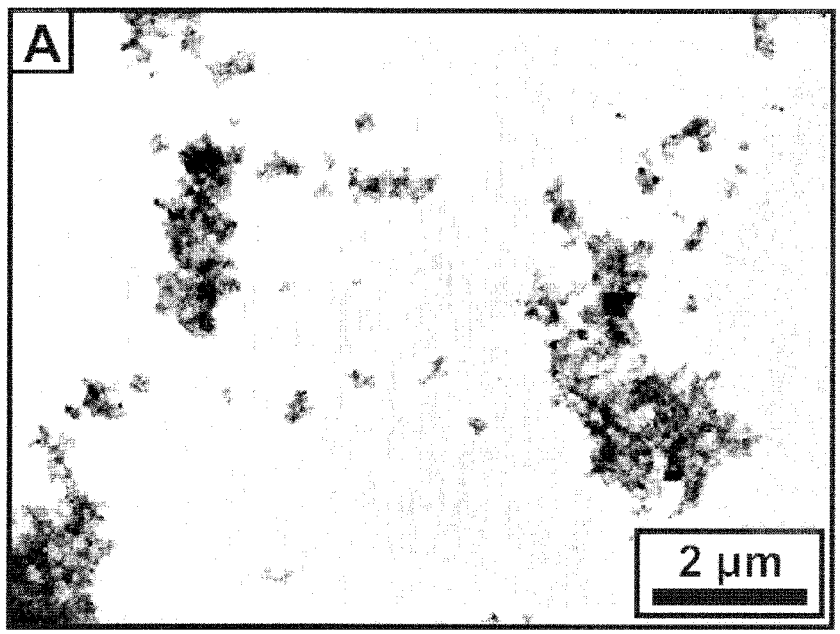
FIG. 11A shows a TEM image of precipitates resulting from a synthesis according to an embodiment of the present invention.
Figure 11B:
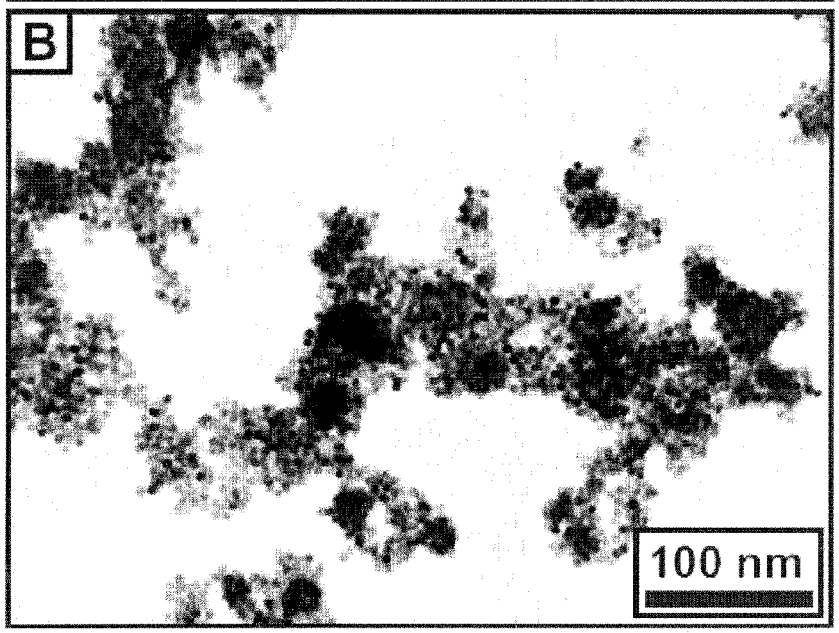
FIG. 11B is a higher-magnification version of FIG. 11A.
Figures 14A, 14B:
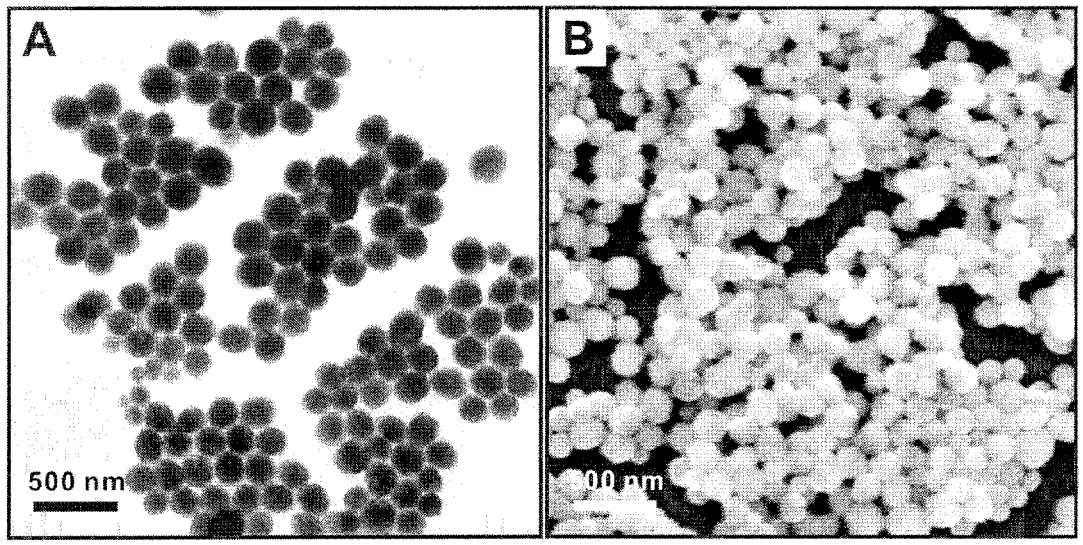
FIG. 14A is a TEM image of disk-like superparticles made with 55-nm CdSe/CdS nanorods.
FIG. 14B is a SEM image of disk-like superparticles made with 55-nm CdSe/CdS nanorods.
Figures 15A, 15B:
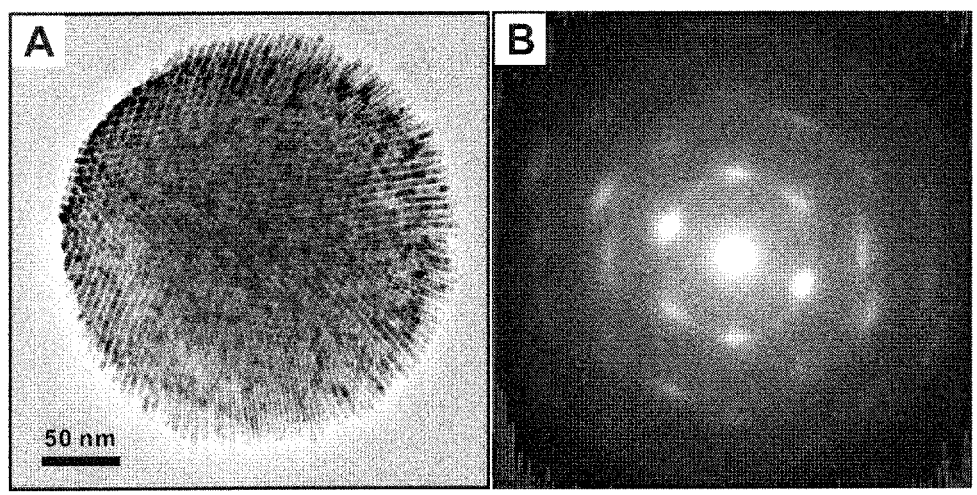
FIG. 15A is a TEM image of a disk-like superparticic with the supercrystalline structure.
FIG. 15B is an electron diffraction pattern taken from this superparticle along the [$\bar{1}2\bar{1}3$] zone axis (camera length of 25 cm). The pattern shows single crystal-like dot patterns, which means the nanorods in the superparticle are perfectly aligned at the atomic level.
Figures 18A, 18B:
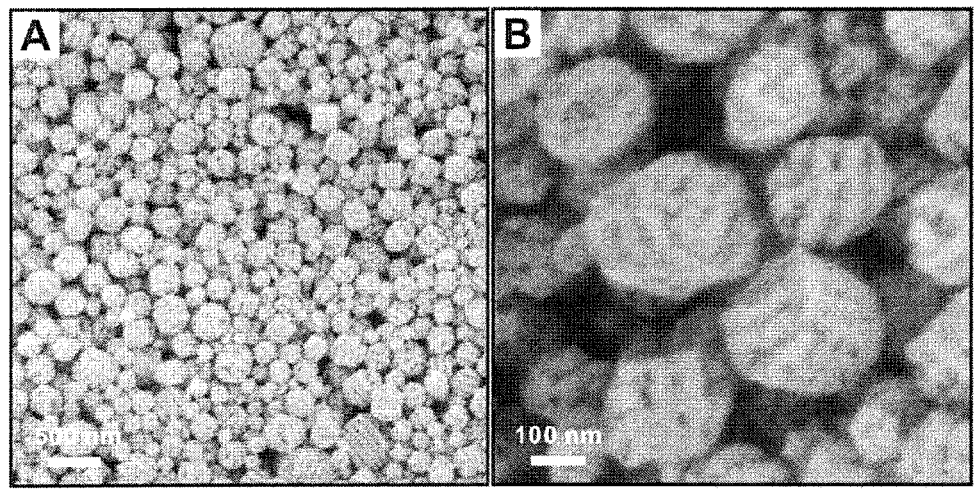
FIG. 18A is a SEM image of superparticles calcined at 450° C. for 40 minutes under forming gas. The superparticles maintain their size and shape after the calcination; the stacked structure clearly appears under SEM.
FIG. 18B is a SEM image showing the stacked structure of the superparticles.
Figure 19:
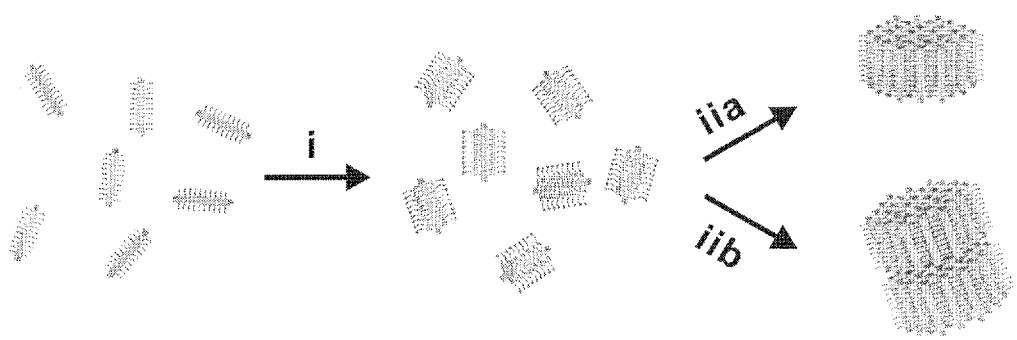
FIG. 19 is a scheme showing the synthesis of superparticles made with nanorods: (i) nanorod-micelle formation, (iia) the formation of disk-like superparticles at low concentration ($C_{rods}$=10 mg/ml) and (iib) the formation of stacked superparticles at high concentration ($C_{rods}$=25 mg/ml).

Referring again to FIG. 6, the solution that the nanoparticle-micelles are mixed with may also be important in the passivation and crystallization stages. The primary role of the solution, such as PVP, should be as a capping reagent to stabilize the SPs through repulsive steric interactions (Butt, H. J. et al., *Physics and Chemistry of Interfaces,* Wiley, Weinheim, 2006). In an embodiment, gelatin can also act as a capping reagent. Without these capping reagents, SPs may not be stable, and their structures may easily collapse during annealing at 80° C., as shown in FIGS. 11A and 11B. Moreover, TEM shows that the annealing treatment is important to the formation of single supercystalline SPs. Referring to FIG. 3E, before annealing, the spherical colloidal SPs do not exhibit superlattice-fringes, indicating the nanoparticles are not perfectly ordered in these SPs. This is due in part to the fact that SP formation is a very rapid process in which nanoparticle building blocks have not yet located their equilibrium positions (Murray, C. B. et al., *Anna. Rev. Mater. Sci.,* 2000, 30:545). After annealing, the spherical SPs show very clear superlattice-fringes, as seen in FIG. 3F. These results suggest that the annealing treatment is accompanied by a crystallization process to re-arrange the nanoparticles into a single supercrystalline structure inside these SPs. In the crystallization process, nanoparticles with a narrow size-distribution and sufficient surface passivation may be important to the formation of the single supercrystalline structure.

In many embodiments, the solvophobic interaction between the nanoparticle and the solution, such as an ethylene glycol solution, is the major driving force for the formation of spherical SPs. Additionally, fine-tuning the solvophobic interaction can help control the final size of the SPs. In forming nanocrystals from molecular precursors, the number of nuclei can be controlled by the reactivity of the molecular precursors, such that higher precursor reactivity leads to fewer nuclei and thus a larger final particle size, and vice versa (Cao, Y. C. and Wang, J., *J. Am. Chem. Soc.,* 2004, 126: 14336). Surprisingly, this principle can be transferable for controlling the size of spherical SPs. The higher reactivity of nanoparticle precursors can correspond to stronger solvophobic interaction between the nanoparticle and the solution, which can be achieved by using a smaller molar ratio between the surfactant and the nanoparticles. Referring to FIGS. 4A-4D, applying this principle can lead to the formation of larger SPs. Additionally, smaller SPs can be made according to the same principle, with lower reactivity of nanoparticle precursors.

In an embodiment, the single supercrystalline colloidal SPs can be doped with organic molecules, such as dye sensitizers. For example, rhodamine-6G can be used to dope the single supercrystalline colloidal SPs.

The development of the method of synthesis of single supercrystalline SPs according to the present invention is important for many reasons. For example, the synthesis approach can be easily generalized for making single supercrystalline colloidal SPs from nonpolar-solvent-dispersible nanoparticles with other size and chemical compositions such as metals, metal oxides, and semiconductors, as referenced in FIGS. 5A-5C. Also, because the formation of spherical SPs can occur separately from the crystallization stage, further control of the crystallization stage could potentially lead to the preparation of single supercrystalline colloidal SPs made of multiple nanoparticle components, such as binary superlattices (Saunders, A. E. and Kirgel, B. A., *ChemPhysChem,* 2005, 6:61; Sheychenko, E. V. et al., *Nature,* 2006, 439:55; Kalsin, A. M. et al., *Science,* 2006, 312:420). Moreover, the properties of the single supercrystalline colloidal SPs can be easily modified by doping with organic molecules such as dye sensitizers. For example, referring to FIG. 5D, rhodamine-6G-doped supercrystalline colloidal SPs (made of 5.4-nm gold nanoparticles) exhibit strong surface-enhanced Raman scattering, likely due to electromagnetic-field enhancement from gold SPs (Schatz, G. C. and Van Duyne, R. P., in *Handbook of Vibrational Spectroscopy,* Chalmers, J. M. and Griffiths, P. R. Eds., Wiley, New York, 2002, pp. 759-774). Additionally, because of their excellent colloidal stability in polar solvents, the single supercrystalline colloidal SPs can also be assembled into more complex and hierarchically ordered materials in which new properties may occur (Markovich, G. et al., *Acc. Chem. Res.,* 1999, 32:415).

The superparticles of the invention are useful for making articles of manufacture including devices (e.g., implantable or deployable medical devices), and coatings for releasing biologically active molecules (optionally, the molecules may be beneficial, e.g., therapeutic). The superparticles of the invention and compositions comprising them can be processed into articles, including delivery devices, and/or coated onto a substrate by standard manufacturing techniques. For example, the nanoparticles of the invention can be extruded into filaments, pressed into shaped articles, solvent film cast, doctor-bladed into thin films, coated onto a substrate by solvent evaporation, compression and transfer molded, and processed by like standard methods of manufacture.

The superparticles of the invention can be used in the production of solar cells (e.g., as backbones of solar cells). For example, superparticles containing mixtures of two or more types of nanoparticles can be used to form close-packed films to absorb light and create charge separation. The superparticles of the invention can be used to make batteries, e.g., to facilitate charge transfer. The superparticles of the invention can be used to make crystal-based light emitting diodes (LEDs), e.g., creating emitting centers. The superparticles of the invention can also be used as a catalyst for photochemical and other chemical reactions. Superparticles comprising, for example, $SnO_2$ can be used as gas sensors.

Figures 5A, 5B, 5C, 5D:
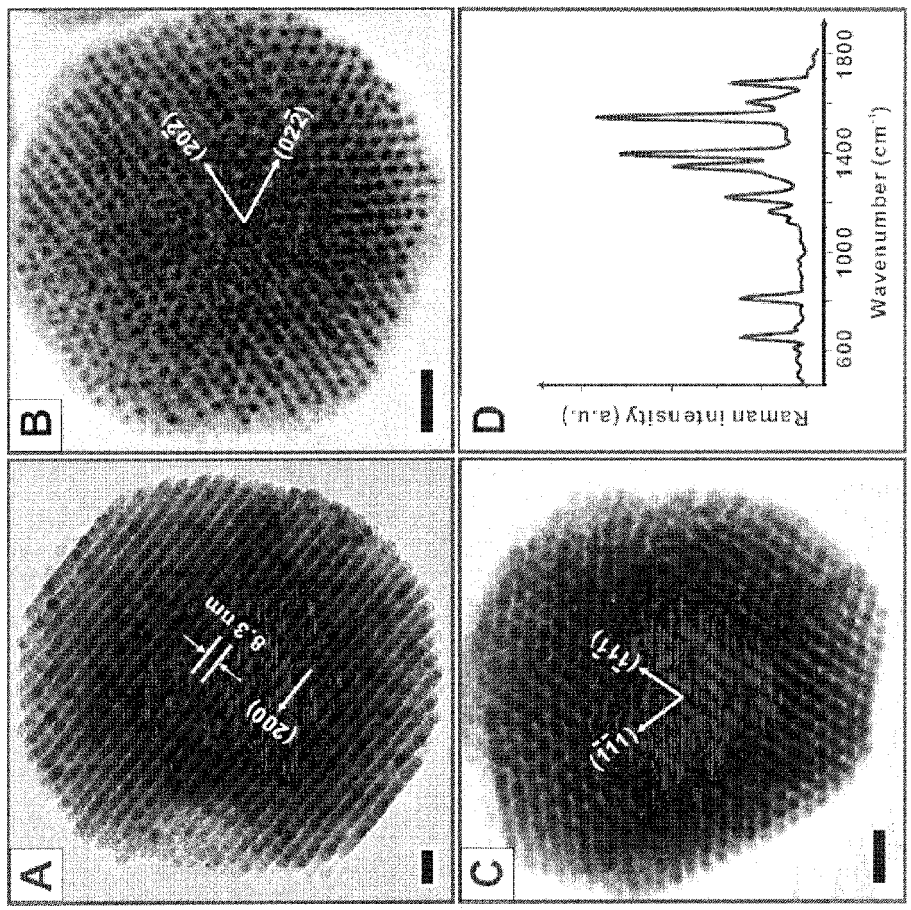
FIG. 5A shows a TEM image of a superparticle made of $Fe_3O_4$ nanoparticles with a diameter of about 8.9±0.4 nm, showing the $\{200\}_{SL}$ superlattice-fringes with a spacing of about 8.3 nm. The scale bar is 20 nm.
FIG. 5B shows a TEM image of a superparticle made of CdSe nanoparticles with a diameter of approximately 6.3±0.3 nm viewed along the [111] axis of the superlattice, showing $\{022\}_{SL}$ superlattice-fringes with a spacing of approximately 4.3 nm. The scale bar is 20 nm.
FIG. 5C shows a TEM image of a superparticle made of gold nanoparticles with a diameter of about 5.4±0.3 nm viewed along the [011] zone axis, showing $\{111\}_{SL}$ fringes with a spacing of about 6.2 nm. The scale bar is 20 nm.
FIG. 5D shows a Raman spectrum of rhodamine-6G-doped supercrystalline colloidal superparticles made of gold nanoparticles with a diameter of about 5.4±0.3 nm.

The superparticles of the invention can be used as a colored sensitizer in the form of an ink or dye to label products and vehicles in commerce or for military applications (e.g., functioning as a "bar code"), for example. Superparticles can be utilized that fluoresce or otherwise react in a detectable way to certain ambient or applied conditions, such as various wavelengths of light. For example, superparticles comprising cadmium selenide nanoparticles that fluoresce under certain wavelengths of light can be utilized (FIG. 5B).

The superparticles of the invention can be used as a single film, or in a number of layers made of different films or superparticles of the invention, and they can be made into devices of various geometric shapes, for example, flat, square, round, tubular, disc, ring, and the like. Furthermore, the devices of the invention can be sized, shaped, and adapted for implantation, insertion or placement on the body, in the body, its cavities and passageways, or for positioning in other environments for example, fields or reservoirs. The superparticles are useful for making devices for dispensing a biologically active molecule (biologically active agent) and for use as coatings.

The superparticles of the invention can be used as drug delivery agents in vitro, ex vivo, or in vivo (for humans or animals). In one aspect, the invention provides pharmaceutical compositions comprising superparticles of the invention bearing drugs or biologically active molecules; and a pharmaceutically acceptable carrier. As used herein, the term "drug" is interchangeable with the term "biologically active molecule" or "bioactive molecule" and refers to any agent capable of having a physiologic effect (e.g., a therapeutic or prophylactic effect, toxic effect, etc.) on a biosystem such as prokaryotic or eukaryotic cells, in vivo or in vitro, including, but without limitation, chemotherapeutics, toxins, radiotherapeutics, radiosensitizing agents, gene therapy vectors, antisense nucleic acid constructs, transcription factor decoys, imaging agents, diagnostic agents, agents known to interact with an intracellular protein, polypeptides, and polynucleotides. Drugs that may be utilized superparticles of the invention include any type of compound, such as antibacterial, antiviral, antifungal, or anti-cancer agents. The drug can be selected from a variety of known classes of drugs, including, for example, analgesics, anesthetics, anti-inflammatory agents, anthelmintics, anti-arrhythmic agents, antiasthma agents, antibiotics (including penicillins), anticancer agents (including Taxol), anticoagulants, antidepressants, antidiabetic agents, antiepileptics, antihistamines, antitussives, antihypertensive agents, antimuscarinic agents, antimycobacterial agents, antineoplastic agents, antioxidant agents, antipyretics, immunosuppressants, immunostimulants, antithyroid agents, antiviral agents, anxiolytic sedatives (hypnotics and neuroleptics), astringents, bacteriostatic agents, beta-adrenoceptor blocking agents, blood products and substitutes, bronchodilators, buffering agents, cardiac inotropic agents, chemotherapeutics, contrast media, corticosteroids, cough suppressants (expectorants and mucolytics), diagnostic agents, diagnostic imaging agents, diuretics, dopaminergics (antiparkinsonian agents), free radical scavenging agents, growth factors, haemostatics, immunological agents, lipid regulating agents, muscle relaxants, proteins, peptides and polypeptides, parasympathomimetics, parathyroid calcitonin and biphosphonates, prostaglandins, radiopharmaceuticals, hormones, sex hormones (including steroids), time release binders, anti-allergic agents, stimulants and anoretics, steroids, sympathomimetics, thyroid agents, vaccines, vasodilators, and xanthines.

The bioactive molecule need not be a therapeutic agent. For example, the bioactive molecule may be cytotoxic to the local cells to which it is delivered but have an overall beneficial effect on the subject. Further, the bioactive molecule may be a diagnostic agent with no direct therapeutic activity per se, such as a contrast agent for bioimaging.

A description of these classes of drugs and diagnostic agents and a listing of species within each class can be found, for example, in Martindale, The Extra Pharmacopoeia, Twenty-ninth Edition (The Pharmaceutical Press, London, 1989), which is incorporated herein by reference in its entirety. Drugs or diagnostic agents are commercially available and/or can be prepared by techniques known in the art.

Superparticles of the invention can be incorporated into medical devices. As used herein, a "medical device" may be defined as a device that has surfaces that contact blood or other bodily tissues in the course of their operation. This can include, for example, extracorporeal devices for use in surgery such as blood oxygenators, blood pumps, blood sensors, tubing used to carry blood and the like which contact blood which is then returned to the patient. This can also include implantable devices such as vascular grafts, stents, electrical stimulation leads, heart valves, orthopedic devices, catheters, shunts, sensors, replacement devices for nucleus pulposus, cochlear or middle ear implants, intraocular lenses, and the like.

The bioactive molecule may be one intended for delivery to the environment, such as a fertilizer. For example, superparticles bearing fertilizing agents can be applied to plants and soil for fertilization purposes.

The embodiments described herein illustrate adaptations of the methods and compositions of the invention. Nonetheless, from the description of these embodiments, other aspects of the invention can also be made and/or practiced.

EXEMPLIFIED EMBODIMENTS

The invention includes, but is not limited to, the following embodiments:

Embodiment 1

A method for synthesizing colloidal superparticles (SPs), comprising:

mixing a first solution comprising ligand-functionalized nanoparticles with a surfactant under aqueous conditions to form a second solution comprising nanoparticle-micelles;

mixing the second solution with a solvent (such as a polar organic solvent, e.g., ethylene glycol, di-ethylene glyocol, tri-ethylene glycol, and/or an oxygen-containing organic solvent) to form a third solution comprising colloidal SPs;

crystallizing the superparticles to form superlattices within the SPs; and isolating the SPs from the third solution.

Embodiment 2

The method of embodiment 1, wherein said crystallizing comprises heating the third solution to a temperature and for a period of time (e.g., about 0.5 to 4 hours) sufficient to result in crystallization and formation of superlattices within the SPs.

Embodiment 3

The method of embodiment 1, wherein said isolating comprises allowing the third solution to cool to a temperature of about 15° C.-30° C. (e.g., room temperature) and centrifuging the third solution to precipitate colloidal SPs.

Embodiment 4

The method of any of embodiments 1-3, wherein each SP comprises one type of nanoparticle.

Embodiment 5

The method of any of embodiments 1-3, wherein each SP comprises two or more types of nanoparticle.

Embodiment 6

The method of any of embodiments 1-4, wherein the nanoparticles are selected from the group consisting of semiconductor nanoparticles (such as CdSe, CdS, CdTe, ZnS, ZnSe, ZnTe, HgS, HgSe, HgTe, PbS, PbSe, PbTe, InAs, InP, GaP, GaAs. FeS, CuS, Ag2S, and/or MnS nanoparticles); alloy semiconductor nanoparticles (such as CdZnS, CdZnSe, CdZnSe CdHgS, CdHgSe, CdHgTe, ZnSSe, CdSSe, HgSSe, CdSeTe, HgSeTe, InGaAs, and/or InGaP nanoparticles); core-shell semiconductor nanoparticles (such as CdS/ZnS, CdSe/ZnS, CdSe/CdS, CdSe/CdS/ZnS, PbSe/PbS, InAs/InP, InP/ZnS, and/or InP/CdS nanoparticles); doped semiconductor nanoparticles (such as Mn-doped ZnSe, Mn-doped CdS/ZnS, Mn-doped ZnSe/ZnS, and/or In-doped CdSe/ZnS nanoparticles); metal nanoparticles particles (such as Au, Ag, Cu, Pt, Cr, Pd, Fe, Co, Ni, Ru, W, Pt/Fe, Pt/Ni, Pt/Co, Ag/Au, and/or Cu/Ag nanoparticles; and metal oxide nanoparticles (such as $Fe_2O_3$, $Fe_3O_4$, $FeMnO_3$, $Fe_2MnO_3$, NiO, MnO, $TiO_2$, $ZrO_2$, $MoO_3$, $WO_3$, $V_2O_5$, $CrO_3$, ZnO, $Al_2O_3$, $Ga_2O_3$, $In_2O_3$, SnO, $SiO_2$, $GeO_2$, and rare earth oxides ($Gd_2O_3$, $UO_2$)).

Embodiment 7

The method of any embodiments 1-5, wherein the nanoparticles comprise $Fe_3O_4$ nanoparticles.

Embodiment 8

The method of any of embodiments 1-5, wherein the nanoparticles comprise CdSe nanoparticles.

Embodiment 9

The method of any of embodiments 1-5, wherein the nanoparticles comprise gold nanoparticles.

Embodiment 10

The method of any of embodiments wherein the ligand of the ligand-functionalized nanoparticles is amphiphilic.

Embodiment 11

The method of any of embodiments 1-9, wherein the ligand comprises a hydrophilic portion (recognition portion or "head") that binds with the nanoparticles, and a hydrocarbon tail.

Embodiment 12

The method of any of embodiments 1-9, wherein the ligand is selected from the group consisting of a fatty acid, fatty amine, fatty phosphonic acid, trioctylphosphine, trioetylphosphine oxide, and tributylphosphine.

Embodiment 13

The method of any of embodiments 1-12, wherein the surfactant is an anionic surfactant (such as sodium dodecyl sulfate (SDS), ammonium lauryl sulfate, other alkyl sulfate salts, Sodium laureth sulfate (also known as sodium lauryl ether sulfate: SLES), or Alkyl benzene sulfonate); cationic surfactant (such as alkyltrimethylammonium salts, cetylpyridinium chloride (CPC), polyethoxylated tallow amine (POEA), benzalkonium chloride (BAC), and benzethonium chloride (BZT)); Zwitterionic surfactant (such as Dodecyl betaine, Dodecyl dimethyl amine oxide, Cocamidopropyl betaine, and Coco ampho glycinate); and/or nonionic surfactant (such as Alkyl poly(ethylene oxide), or alkyl polyglucosides (Octyl glucoside and Decyl maltoside)).

Embodiment 14

The method of any of embodiments 1-12, wherein the surfactant is dodecyltrimethylammonium bromide (DTAB) and/or cetyltrimethylammonium bromide (CTAB).

Embodiment 15

The method of any of embodiments 1-14, wherein the third solution further comprises a passivation ligand such as poly(vinyl pyrrolidone) (PVP); ethylene glycol; an amphiphilic copolymer such as poly(ethylene glycol)-block-poly(propylene glycol-block-poly(ethyle glycol) (PEO-PPO-PEO); and/or an amphiphilic biomolecule such as gelatin.

Embodiment 16

The method of any of embodiments 1-15, further comprising:
re-dispersing the colloidal SPs in a polar solvent to form a fourth solution; and centrifuging the fourth solution.

Embodiment 17

The method of embodiment 16, wherein the polar solvent is selected from the group consisting of water, ethanol, methanol, ethylene glycol, di-ethyl ene glycol, and tri-ethylene glycol.

Embodiment 18

The method of any of embodiments 1-17, wherein the first solution further comprises a solvent, and wherein the second solution comprises a solvent.

Embodiment 19

The method of embodiment 18, wherein the solvent in the first solution and second solution is selected from the group consisting of chloroform, toluene, and dichloromethane.

Embodiment 20

The method of embodiment 18 or 19, further comprising removing the solvent from the second solution.

Embodiment 21

The method of embodiment 20, wherein said removing comprises removing the solvent by bubbling argon.

Embodiment 22

A colloidal superparticle (SP), comprising an aggregate of nanoparticles, wherein adjacent nanoparticles are bound together through non-covalent interactions.

Embodiment 23

The colloidal SP of embodiment 22, wherein the SP is supercrystalline (having a superlattice structure).

Embodiment 24

The colloidal SP of embodiment 23, wherein the superlattice structure is a face-centered cubic (foe) superlattice structure.

Embodiment 25

The colloidal SP of any of embodiments 22-24, wherein the SP comprises one type of nanoparticle.

Embodiment 26

The colloidal SP of any of embodiments 22-24, wherein the SP comprises two or more types of nanoparticle.

Embodiment 27

The colloidal SP of any of embodiments 22-26, wherein the nanoparticles are doped.

Embodiment 28

The colloidal SP of any of embodiments 22-26, wherein the SP comprises a dye inside or outside the nanoparticles.

Embodiment 29

The colloidal SP of any of embodiments 22-28, wherein the SP is synthesized by the method of any of embodiments 1-16.

Embodiment 30

A film comprising colloidal SPs of any of embodiments 1-29.

As used in this specification, the singular "a", "an", and "the" include plural reference unless the context dictates otherwise. Thus, for example, a reference to "a superparticle" can include more than one such superparticle or type of superparticle. A reference to "a nanoparticle" can include more than one such nanoparticle or type of nanoparticle. A reference to "a solvent" can include more than one such solvent or type of solvent. A reference to "a ligand" can include more than one such ligand or type of ligand. A reference to "a surfactant" can include more than one such surfactant or type of surfactant. A reference to "a dye" can include more than one such dye or type of dye, and so forth.

The terms "comprising", "consisting of" and "consisting essentially of" are defined according to their standard meaning. The terms may be substituted for one another throughout the instant application in order to attach the specific meaning associated with each term.

Materials and Methods

Chemicals. Oleic acid (OA, 90%), 1-octadecene (ODE, 90%), rhodamine 6G (99%), cetyltrimethylammonium bromide (CTAB, 99%), trioctylphosphine oxide (TOPO, 99%), tributylphosphine (TBP, 97%) octadecylamine (ODA, 97%), poly(vinylpyrrolidone) (PVP, MW=55,000), gelatin (from porcine skin, type A), and ethylene glycol (99%) were purchased from Aldrich. Cadmium oxide (CdO, 99.998%), selenium (Se, 99.99%), and dodecyl trimethylammonium bromide (DTAB, 97%) were purchased from Alfa Aesar. Nanopure water (18 MΩcm) was made by the Barnstead Nanopure Diamond system. All the other solvents were purchased from Fisher Scientific International, Inc.

Nanoparticle Synthesis.

$Fe_3O_4$ nanoparticles were prepared according to the literature method (Park, J. et al, *Nature Mater.,* 2004, 3:891). Two samples were synthesized. The first sample had nanoparticles with a diameter of 5.8 nm and a standard deviation of 3.7%, and the second sample had particles of 8.9 nm in diameter with a standard deviation of 3.2%.

CdSe nanocrystals were synthesized based on a modified literature method (Qu, L. and Peng, X., *J. Am. Chem. Soc.,* 2002, 124:2049). CdO powder (0.256 g, 2.00 mmol) and stearic acid (4.55 g, 16.0 mmol) were mixed in a 250-ml three-neck flask. The mixture was heated to 240° C. under argon flow and kept at that temperature until a colorless solution was formed. After the solution was cooled to room temperature, octadecylamine (18.0 g) and trioctylphosphine oxide (18.0 g) were added into the reaction flask. The reaction system was re-heated to 280° C. under argon flow, and a Se TBP solution (0.900 mM, 10.0 mL) was swiftly injected into the system. The temperature was naturally dropped to 270° C. and maintained. The particle size was monitored by UV-Vis spectroscopy on a Shimadzu UV 1700 spectrophotometer, and the reaction was stopped when the nanoparticles reached a desired size. The nanoparticles were extracted from the reaction solution using a hexane/methanol (1:1) mixture, and the extraction was performed three more times. The purified CdSe nanoparticles were dispersed in chloroform as a stock solution. TEM shows that the resulting nanoparticles have a 6.3-nm diameter with a standard deviation of 4.5%.

Gold nanocrystals were synthesized according to the literature procedure (Prasad, B. L. V. et al., *Langmuir,* 2002, 18:7515). The resulting nanoparticles have a diameter of 5.4 nm with a standard deviation of 4.1%.

TEM and SAED Measurements.

TEM measurements were performed on a JEOL 200X operated at 200 kV or a JEOL 2010F TEM operated at 200 kV. SAED patterns were acquired by the 2010F TEM and operated at 200 kV with a camera length of 200 cm. The specimens were prepared as follows: a particle solution (10 μL) was dropped onto a 200-mesh copper grid and was dried overnight at ambient conditions.

SEM Measurement.

SEM measurements were performed on a Hitachi S-4000 FE-SEM operated at 6 kV. The samples were prepared as follows: an ethanol solution of superparticles made of 5.8-nm $Fe_3O_4$ (~20 μl) was dropped onto a silicon wafer and was dried overnight at ambient conditions. A high concentration of this superparticle solution led to the formation of multi-layered, close-packed superparticle solids (FIG. 1C).

For the assembly under an external magnetic field, an ethanol solution of the superparticles (~20 μL) was dropped onto a silicon wafer, which was placed on top of a magnet cube (purchased from K&J Magnetics). The surface field of the magnet is ~4200 Gauss. The sample was dried overnight at ambient conditions.

Small-Angle XRD Measurement of Supercrystalline Colloidal Superparticles Made from 5.8-Nm $Fe_3O_4$ Nanoparticles.

Small-angle X-ray diffraction spectra were measured on a Philips MRD X'Pert System with Cu—$K_{α1}$ radiation ($λ=1.54056$ Å), operated at 45 kV and 40 mA. The sample was prepared as follows: approximately 20 mg of supercrystalline colloidal superparticles (560 nm in diameter) were dispersed in 0.50 mL of ethanol. Then, the solution was drop-casted onto a low-scattering quartz plate, and the sample was dried overnight at ambient conditions. The resulting particle film had a thickness of about 12 microns. The bare quartz plate was measured as the background reference.

Calculation of the Lattice Constant (a) of the Supercrystalline Colloidal Superparticles Made from 5.8-Nm $Fe_3O_4$ Nanoparticles.

The structural data from TEM, SAED and XRD show that supercrystalline colloidal superparticles have a fcc superlattice. The lattice constant (a) was calculated from these data using the formula:

$$a = d_{hkl} \times \sqrt{h^2+k^2+l^2}$$

TEM Images.

Table 1 shows the d-spacing between the superlattice fringes measured from the TEM images and the calculated lattice constant (a), respectively.

TABLE 1

Superlattice Fringe d-spacing and Calculated Lattice Constant (a)

| [001] zone | [011] zone | [111] zone |
|---|---|---|
| $d_{(200)}$ = 5.91 nm | $d_{(111)}$ = 6.76 nm | $d_{(220)}$ = 4.07 nm |
| a = 11.82 nm | a = 11.71 nm | a = 11.52 nm |
| $d_{(220)}$ = 4.10 nm | $d_{(200)}$ = 5.95 nm | |
| a = 11.74 nm | a = 11.90 nm | |
| | $d_{(220)}$ = 4.06 nm | |
| | a = 11.47 nm | |

From these data, the value for the lattice constant (a) was determined to be 11.7±0.2 nm.

SAED.

The d spacing between supperlattice planes with Miller indices {hkl} was calculated by the following formula:

$$d_{hkl} = \frac{\lambda L}{R_{hkl}}$$

where L is the camera length, 200 cm; R is the distance measured form ED pattern; and λ is the wavelength of electrons, 0.00251 nm at 200 keV)

Table 2 lists the d-spacing between superlattice planes calculated from the SAED images and the calculated lattice constant (a), respectively.

TABLE 2

Superlattice Plane d-spacing and Calculated Lattice Constant (a)

| [001] zone | [011] zone | [111] zone |
|---|---|---|
| $d_{(200)}$ = 5.80 nm | $d_{(111)}$ = 6.76 nm | $d_{(220)}$ = 4.08 nm |
| a = 11.60 nm | a = 11.70 nm | a = 11.54 nm |
| $d_{(220)}$ = 4.07 nm | $d_{(200)}$ = 5.84 nm | |
| a = 11.52 nm | a = 11.68 nm | |
| | $d_{(220)}$ = 4.10 nm | |
| | a = 11.60 nm | |

From these data the value for the lattice constant (a) was found to be 11.6±0.1 nm.

Small-Angle XRD.

The d-spacing between superlattice planes with Miller indices {hkl} was calculated by the Bragg equation, $\lambda=2d \sin \theta$. The value of θ was obtained from the small-angle XRD pattern.

Table 3 shows the Bragg diffraction angles, d spacing and the calculated lattice constant (a), respectively.

TABLE 3

Bragg Diffraction Angles, d-spacing, and Calculated Lattice Constant (a)

| | 2θ | D (nm) | a (nm) |
|---|---|---|---|
| 111 | 1.30 | 6.79 | 11.76 |
| 200 | 1.52 | 5.80 | 11.60 |
| 311 | 2.46 | 3.59 | 11.90 |
| 400 | 2.88 | 3.06 | 12.24 |
| 333 | 3.77 | 2.34 | 12.15 |
| 444 | 5.13 | 1.72 | 11.90 |

From these data the value for the lattice constant (a) was found to be 11.9±0.3 nm.

Example 1

Synthesis of Supercrystalline Colloidal Superparticles from $Fe_3O_4$ Nanoparticles DTAB (20.0 mg, 65.0 μmol) was dissolved in Nanopure water (1.0 mL) to form a solution. A chloroform solution of 5.8-nm $Fe_3O_4$ nanoparticles (28 μM, 1.0 mL) was thoroughly mixed with the DTAB solution by a vortex mixer. Then, the chloroform was removed from the mixture by bubbling Ar at 40° C. A clear, dark nanoparticle-micelle aqueous solution was obtained (Fan, H. et al, Nano Lett., 2005, 5:645).

This $Fe_3O_4$ nanoparticle-micelle aqueous solution was injected into a three-neck flask with a PVP ethylene glycol solution (2.0 mM, 5.0 mL) under vigorous stirring. The mixture solution was further stirred at room temperature for 10 minutes and then heated to 80° C. under Ar flow at 10° C./min. After aging at 80° C. for 6 hours, the solution was cooled to room temperature. The resulting colloidal superparticles were separated by centrifuge (500 g, 15 minutes). The black precipitate was re-dispersed into ethanol and the superparticles were further purified twice by centrifugation. The superparticles had a diameter of 190 nm and a yield of about 70%. During the synthesis, serial aliquots (~100 µL) were taken for the mechanistic studies on superparticle formation, and samples were characterized by using TEM, as shown in FIGS. 3A-3F and FIGS. 9A and 9B.

The size-controlled synthesis of superparticles using different molar ratios between DTAB and nanoparticles was performed by a similar procedure to that described above. Samples of superparticles with different sizes were obtained. The size and size-distribution of these superparticles are shown in FIGS. 4A-4D.

In addition, the synthesis of colloidal superparticles using 8.9-nm $Fe_3O_4$ nanoparticles was carried out using a similar procedure to that described above.

Example 2

Synthesis of Supercrystalline Colloidal Superparticles from CdSe Nanoparticles

In a typical synthesis, DTAB (20.0 mg, 65.0 µmol) was dissolved in Nanopure water (1.0 mL) to form a solution. A chloroform solution of 6.3-nm CdSe nanoparticles (28 µM, 1.0 mL) was thoroughly mixed with the DTAB solution by a vortex mixer. Then, the chloroform was removed from the mixture by bubbling Ar at 40° C. A clear nanoparticle-micelle aqueous solution was obtained. The concentration of CdSe nanoparticles in chloroform was determined by UV-Vis spectroscopy on a Shimadzu UV 1700 spectrophotometer. A molar absorptivity ($\epsilon$-CdSe) of $7.9 \times 10^5$ $M^{-1} \cdot cm^{-1}$ for 6.3-nm CdSe nanoparticles was used for the calculation (Yu, W. W. et al., *Chem. Mater.*, 2003, 15:2854).

This CdSe nanoparticle-micelle aqueous solution was injected into a three-neck flask with a PVP ethylene glycol solution (2.0 mM, 5.0 mL) under vigorous stirring. The mixture solution was stirred for 10 minutes, and then heated to 80° C. under Ar flow at 10° C./min. After aging at 80° C. for 8 hours, the solution was cooled to room temperature. The resulting CdSe superparticles were separated by centrifuge (500 g, 15 minutes). The resulting precipitate was re-dispersed into ethanol, and the superparticles were further purified twice by centrifugation.

Example 3

Synthesis of Supercrystalline Colloidal Superparticles from Au Nanoparticles

In a typical synthesis, DTAB (20.0 mg, 65.0 µmol) was dissolved in Nanopure water (1.0 mL) to form a solution. A chloroform solution of 5.4-nm gold nanoparticles (28 µM, 1.0 mL) was thoroughly mixed with the DTAB solution by a vortex mixer. Then, the chloroform was removed from the mixture by bubbling Ar at 40° C. A clear, dark red nanoparticle-micelle aqueous solution was obtained. The concentration of gold nanoparticles in chloroform was determined by UV-Vis spectroscopy on a Shimadzu LTV 1700 spectrophotometer. A molar absorptivity ($\epsilon$-Au) of $1.1 \times 10^7$ $M^{-1} \cdot cm^{-1}$ for 5.4-nm gold nanoparticles was used for the calculation (Mayer, M. M. et al, *Anal. Chim. Acta,* 2003, 496:17).

This gold nanoparticle-micelle aqueous solution was injected into a three-neck flask with a PVP ethylene glycol solution (2.0 mM, 5.0 mL) under vigorous stirring. The mixture solution was stirred for 10 minutes, and a gelatin aqueous solution (1.0%, 0.50 mL) was added, and then heated to 80° C. under Ar flow at 10° C./min. After aging at 80° C. for 1 hour, the solution was cooled to room temperature. The resulting gold superparticles were separated by centrifuge (500 g, 15 minutes). The precipitate was re-dispersed into water, and the superparticles were further purified twice by centrifugation.

Example 4

Synthesis of Gold Superparticles Doped with Rhodamine 6G, and Raman Spectroscopy Measurements In a typical synthesis, DTAB (20.0 mg, 65.0 µmol) was dissolved in Nanopure water (1.0 mL) to form a solution. A chloroform solution of 5.4-nm gold nanoparticles (28 µM, 1.0 mL) was thoroughly mixed with the DTAB solution by a vortex mixer. Then, the chloroform was removed from the mixture by bubbling Ar at 40° C., yielding a clear, dark red nanoparticle-micelle aqueous solution.

An ethanol solution of rhodamine 60 (0.100 mM, 10.0 µL) was added into this nanoparticle-micelle solution, and then the mixture was injected into a three-neck flask with ethylene glycol (5.0 mL) and PVP (0.500 g, 10.0 µmol). The mixture solution was stirred for 10 minutes, and a gelatin aqueous solution (1.0%, 0.50 ml) was added. The mixture solution was heated to 80° C. under Ar flow. The reaction solution was aged at the same temperature for 1 hour, and the solution was cooled to room temperature. The doped superparticles were separated by centrifuge (500 g, 15 minutes). The precipitate was re-dispersed into water, and the superparticles were further purified twice by centrifugation.

Raman spectra were obtained using a Nanoraman ADV Raman system. The specimens were prepared by drop-casting an aqueous solution of doped gold superparticles (50 µL) onto a glass slide. The laser (He—Ne, 633 nm) power was 42 mW. The collection time of the spectrum was 0.5 second.

Example 5

Using CTAB as a Surfactant in Superparticle Synthesis

Cetyltrimethylammortium bromide (CTAB, a 16-carbon surfactant) was used to replace DTAB (a 12-carbon surfactant) in the superparticle synthesis for two reasons: (1) CTAB has a much lower solubility in ethylene glycol than DTAB (15.0 mg/mL vs. 200 mg/mL), and (2) CTAB has a stronger van der Waals interaction with the $Fe_3O_4$ nanoparticle ligands, i.e., oleic acid (Butt, H. J. et al., *Physics and Chemistry of Interfaces*, Wiley, Weinheim, 2006).

To examine surfactant effects, a synthesis was carried out according to the typical synthesis for making $Fe_3O_4$ superparticles described in page S-2, but CTAB was used instead of DTAB. CTAB (22.4 mg, 65.0 µmol) was dissolved in Nanopure water (1.0 mL) by ultrasonication. A chloroform solution of 5.8-nm $Fe_3O_4$ nanoparticles (28 µM, 1.0 mL) was thoroughly mixed with the CTAB solution by a vortex mixer.

Then, the chloroform was removed from the mixture by bubbling Ar at 40° C. A clear, dark nanoparticle-micelle aqueous solution was obtained.

This $Fe_3O_4$ nanoparticle-micelle aqueous solution was injected into a three-neck flask with a PVP ethylene glycol solution (2.0 mM, 5.0 mL) under vigorous stirring. The mixture solution was further stirred at room temperature for 10 minutes and then heated to 80° C. under Ar flow at 10° C./min. After aging at 80° C. for 6 hours, the solution was cooled to room temperature. No precipitate was obtained under centrifugation at 500 g for 1 hour. Further centrifugation at 12,500 g for 30 minutes yielded some black precipitates. These black precipitates were highly dispersible in water, and the TEM measurements in FIGS. 10A and 10B show that these samples did not contain spherical superparticles but just monodispersed 5.8-nm $Fe_3O_4$ nanoparticles. Taken together, these results demonstrate that the CTAB nanoparticle-micelles are stable in these synthesis conditions, suggesting that the solvophohic interaction is important to the synthesis of superparticles.

Example 6

Synthesis of Single Supercrystalline Colloidal Superparticles without Using PVP

To examine the function of PVP, a synthesis was carried out according to the typical synthesis for making $Fe_3O_4$ superparticles described in Example 1 above, but without PVP in the synthesis system. The TEM measurements in FIG. 3 show that such syntheses did result in superparticles. However, these superparticles were not stable and were easily destroyed during annealing at 80° C. for 6 hours, as shown in FIGS. 11A and 11B. These unstable superparticles are useful in coatings, for example. Next, the amount of PVP was varied from 0.200 g to 1.50 g for different syntheses. TEM studies show that the amount of PVP in the synthesis system did not significantly affect the size or shape of the resulting superparticles.

Example 7

Synthesis of Supercrystalline Colloidal Superparticles from $Fe_3O_4$ Nanoparticles of Two Different Sizes DTAB (40.0 mg, 130.0 mot) was dissolved in Nanopure water (2.0 mL) to form a solution. A chloroform solution of 5.8-nm $Fe_3O_4$ nanoparticles (28 μM, 2.0 mL) was thoroughly mixed with the DTAB solution by a vortex mixer. Afterwards, the chloroform was removed from the mixture by bubbling Ar at 40° C. A clear, dark nanoparticle-micelle aqueous solution was obtained. Using a similar procedure, an aqueous solution of nanoparticle-micelle (with 8.9-nm $Fe_3O_4$ nanoparticles) was prepared.

A. A $Fe_3O_4$ nanoparticle-micelle aqueous solution (1 mL, with molar ratio between nanoparticle-micelle solutions of 5.8-nm and 8.9-nm $Fe_3O_4$ nanoparticles=1:1) was injected into a three-neck flask with a PVP ethylene glycol solution (2.0 mM, 5.0 mL) under vigorous stirring. The mixture solution was further stirred at room temperature for 10 min and then heated to 80° C. under Ar flow at 10° C./minute. After aging at 80° C. for 6 hours, the solution was cooled to room temperature. The resulting colloidal superparticles were separated by centrifuge (500 g, 15 minutes). The black precipitate was re-dispersed into ethanol and the superparticles were further purified twice by centrifugation. TEM image show that the superparticles possess a core-shell structure with 5.8-nm particle in the core and 8.9-nm particle at the shell (FIG. 12A).

B. A $Fe_3O_4$ nanoparticle-micelle aqueous solution (1 mL, with molar ratio between nanoparticle-micelle solutions of 5.8-nm and 8.9-nm $Fe_3O_4$ nanoparticles=10:1) was injected into a three-neck flask with a PVP ethylene glycol solution (2.0 mM, 5.0 mL) under vigorous stirring. The mixture solution was further stirred at room temperature for 10 minutes and then heated to 80° C. under Ar flow at 10° C./minute. After aging at 80° C. for 6 hours, the solution was cooled to room temperature. The resulting colloidal superparticles were separated by centrifuge (500 g, 15 minutes). The black precipitate was re-dispersed into ethanol and the superparticles were further purified twice by centrifugation. TEM image show that the superparticles possess a core-shell structure with 5.8-nm particle in the core and 8.9-nm particle at the shell (FIG. 12 B). In this case, TEM image clearly show the 5.8-nm particles locates at the core and 8.9-nm particles at the shell part of the superparticle (FIG. 12 B).

Example 8

Synthesis of Supercrystalline Colloidal Superparticles from 5.8-nm $Fe_3O_4$ Nanoparticles and 5.4-nm Gold Particles According to the procedure described above, an aqueous solution of 5.8-nm $Fe_3O_4$ nanoparticle-micelle (28 μM, 0.5 mL) and an aqueous solution 5.4-nm Au nanoparticle-micelle (28 μM, 0.5 mL) were prepared respectively. Next, a mixture of these two solutions was made, and injected into a three-neck flask with a PVP ethylene glycol solution (2.0 mM, 5.0 mL) under vigorous stirring. The mixture solution was further stirred at room temperature for 10 minutes and then heated to 80° C. under Ar flow at 10° C./minute. After aging at 80° C. for 6 hours, the solution was cooled to room temperature. The resulting colloidal superparticles were separated by centrifuge (500 g, 15 minutes). The black precipitate was re-dispersed into ethanol and the superparticles were further purified twice by centrifugation. TEM image show that the superparticles possess both 5.4-nm gold nanoparticles and 5.8-nm $Fe_3O_4$ nanoparticle (FIG. 13).

Example 9

Synthesis of Superparticles from CdSe/CdS Nanorods

CdSe/CdS nanorods were prepared according to the literature method (Carbone et al. *Nano Lett.*, 2007; 7:2942). The sample has nanorods with a diameter of 3.7 nm (standard deviation 3.3%) and length of 55 nm (standard deviation 4.7%).

In a typical synthesis, DTAB (20.0 mg, 65.0 μmol) was dissolved in Nanopure water (1.0 mL) to form a solution. A chloroform solution of 55-nm CdSe/CdS nanorods (28 μM, 1.0 mL) was thoroughly mixed with the DTAB solution by a vortex mixer. Afterward, the chloroform was removed from the mixture by bubbling Ar at 40° C. A clear, yellow nanorod-micelle aqueous solution was obtained.

This nanorod-micelle aqueous solution was injected into a three-neck flask with a PVP ethylene glycol solution (2.0 mM, 5.0 mL) under vigorous stirring. The mixture solution was further stirred at room temperature for 10 minutes, and then an aqueous solution of Tween-20 derivative (0.1 mM, 1 mL) was injected into the flask. Under Ar flow, the mixture solution was heated to 80° C. at 10° C./min. After aging at 80° C. for 1 hour, the solution was cooled to room temperature. The resulting colloidal superparticles were separated by centrifuge (500 g, 15 minutes). The yellow precipitate was re-dispersed into ethanol and the superparticles were further purified twice by centrifugation. The disk-like superparticles have a diameter of 190 nm with a standard deviation of 15% and a yield of 70%. The Tween-20 derivative was synthesized according to the literature method (Wu et al. *Angew. Chem. Int. Ed.*, 2008, 47:3730). (see FIGS. 14A-14B and 15A-15B)

Example 10

Synthesis of Stacked Superparticles Made with CdSe/CdS Nanorods

CdSe/CdS nanorods were prepared according to the literature method (Carbone et al. *Nano Lett.*, 2007; 7:2942). The sample has nanorods with a diameter of 3.7 nm (standard deviation 3.3%) and length of 55 nm (standard deviation 4.7%).

In a typical synthesis, DTAB (20.0 mg, 65.0 µmol) was dissolved in Nanopure water (1.0 mL) to form a solution. A chloroform solution of 55-nm CdSe/CdS nanorods (62 µM, 1.0 mL) was thoroughly mixed with the DTAB solution by a vortex mixer. Afterward, the chloroform was removed from the mixture by bubbling Ar at 40° C. A clear, yellow nanorod-micelle aqueous solution was obtained.

This nanorod-micelle aqueous solution was injected into a three-neck flask with a PVP ethylene glycol solution (2.0 mM, 5.0 mL) under vigorous stirring. The mixture solution was further stirred at room temperature for 10 minutes and then a Tween 20-SH solution (0.1 mM, 1 mL) was injected into the flask. Under Ar flow, the mixture solution was heated to 80° C. at 10° C./min. After aging at 80° C. for 1 hour, the solution was cooled to room temperature. The resulting colloidal superparticles were separated by centrifuge (500 g, 15 minutes). The yellow precipitate was re-dispersed into ethanol and the superparticles were further purified twice by centrifugation. The superparticles have an average diameter of 200 nm and an average length of 390 nm. The yield is 70%.

The calcination of the superparticles was conducted in a tube furnace at 450° C. under the flow of forming gas (5% $H_2$ mixed with 95% $N_2$). After the calcination at 450° C. for 40 minutes, the superparticles were cooled to room temperature under argon flow. (see FIGS. 16-20)

Example 11

Synthesis of Superparticles with a Mixture of 100-nm and 55-nm-Long CdSe/CdS Nanorods In a typical synthesis, DTAB (20.0 mg, 65.0 µmol was dissolved in Nanopure water (1.0 mL) to form a solution. A chloroform solution of 55-nm CdSe/CdS nanorods (28 µM, 100 µmL) and 100-nm CdSe/CdS nanorods (28 µM, 900 µmL) was thoroughly mixed with the DTAB solution by a vortex mixer. Afterward, the chloroform was removed from the mixture by bubbling Ar at 40° C. A clear, yellow nanorod-micelle aqueous solution was obtained.

This nanorod-micelle aqueous solution was injected into a three-neck flask with a PVP ethylene glycol solution (2.0 mM, 5.0 mL) under vigorous stirring. The mixture solution was further stirred at room temperature for 10 minutes and then a Tween 20-SH solution (0.1 mM, 1 mL) was injected into the flask. Under Ar flow, the mixture solution was heated to 80° C. at 10° C./min. After aging at 80° C. for 1 hour, the solution was cooled to room temperature. The resulting colloidal superparticles were separated by centrifuge (500 g, 15 minutes). The yellow precipitate was re-dispersed into ethanol and the superparticles were further purified twice by centrifugation. (see FIG. 21)

Example 12

Synthesis of Superparticles with 33-nm and 55-nm-Long CdSe/CdS Nanorods

In a typical synthesis, DTAB (20.0 mg, 65.0 µmol) was dissolved in Nanopure water (1.0 mL) to form a solution. A chloroform solution of 33-nm CdSe/CdS nanorods (28 µM, 100 µmL) and 55-nm CdSe/CdS nanorods (28 µM, 900 µmL) was thoroughly mixed with the DTAB solution by a vortex mixer. Afterward, the chloroform was removed from the mixture by bubbling Ar at 40° C. A clear, yellow nanorod-micelle aqueous solution was obtained.

Figure 22:
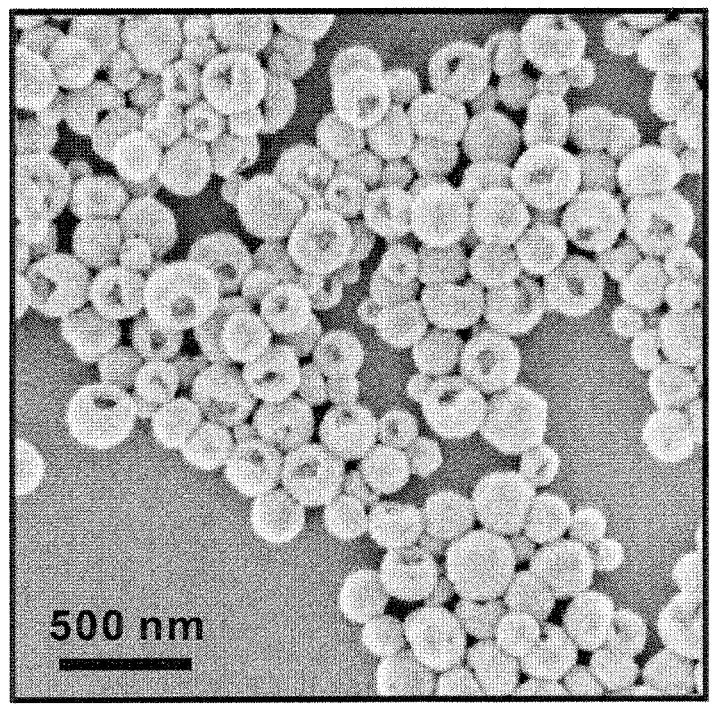
FIG. 22 is a TEM image of superparticles made with 55-nm and 33-nm-long nanorods.

This nanorod-micelle aqueous solution was injected into a three-neck flask with a PVP ethylene glycol solution (2.0 mM, 5.0 mL) under vigorous stirring. The mixture solution was further stirred at room temperature for 10 minutes and then a Tween 20-SH solution (0.1 mM, 1 mL) was injected into the flask. Under Ar flow, the mixture solution was heated to 80° C. at 10° C./min. After aging at 80° C. for 1 hour, the solution was cooled to room temperature. The resulting colloidal superparticles were separated by centrifuge (500 g, 15 minutes). The yellow precipitate was re-dispersed into ethanol and the superparticles were further purified twice by centrifugation. (see FIG. 22)

Example 13

Synthesis of Superparticles with $TiO_2$ Nanoparticles $TiO_2$ nanoparticles were prepared according to the literature method (Zhang et al. *Nano Lett.*, 2007; 7:3203). The sample has nanoparticles with a diameter of 11.7 nm and a standard deviation of 5.8%.

In a typical synthesis, DTAB (20.0 mg, 65.0 µmol) was dissolved in Nanopure water (1.0 mL) to form a solution. A chloroform solution of 11.7-nm $TiO_2$ nanoparticles (28 µM, 1.0 mL) was thoroughly mixed with the DTAB solution by a vortex mixer. Afterward, the chloroform was removed from the mixture by bubbling Ar at 40° C. A clear, white nanoparticle-micelle aqueous solution was obtained.

Figures 23A, 23B:
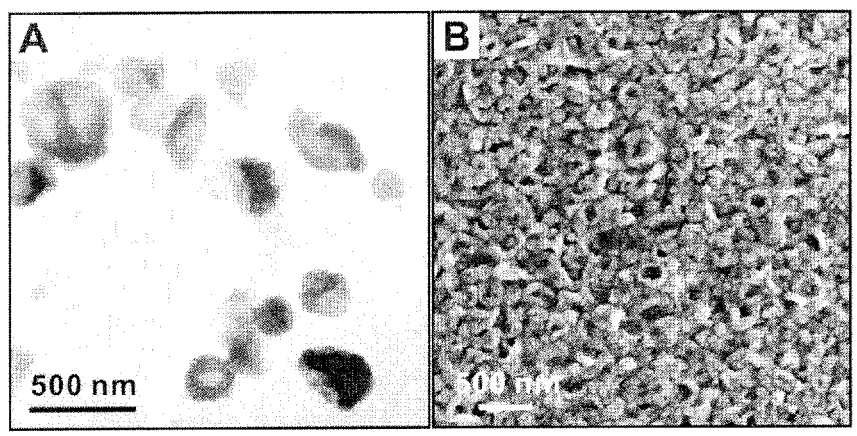
FIG. 23A is a TEM image of half-spherical superparticles made with 11-nm $TiO_2$ nanoparticles.
FIG. 23B is a SEM image of half-spherical superparticles made with 11-nm $TiO_2$ nanoparticles.

This $TiO_2$ nanoparticle-micelle aqueous solution was injected into a three-neck flask with a PVP ethylene glycol solution (2.0 mM, 5.0 mL) under vigorous stirring. The mixture solution was further stirred at room temperature for 10 minutes and then heated to 80° C. at 10° C./min under Ar flow. After aging at 80° C. for 6 hours, the solution was cooled to room temperature. The resulting colloidal superparticles were separated by centrifuge (500 g, 15 minutes). The white precipitate was re-dispersed into ethanol and the superparticles were further purified twice by centrifugation. The superparticles have a half-spherical shape. (see FIGS. 23A-23B)

Example 14

Synthesis of Superparticles Made with $SnO_2$ Nanoparticles $SnO_2$ nanoparticles used in assembly have a diameter of 4.4 nm and a standard deviation of 4.1%.

In a typical synthesis, DTAB (20.0 mg, 65.0 μmol) was dissolved in Nanopure water (1.0 mL) to form a solution. A chloroform solution of 4.4-nm $SnO_2$ nanoparticles (28 μM, 1.0 mL) was thoroughly mixed with the DTAB solution by a vortex mixer. Afterward, the chloroform was removed from the mixture by bubbling Ar at 40° C. A clear, dark nanoparticle-micelle aqueous solution was obtained.

Figure 24:
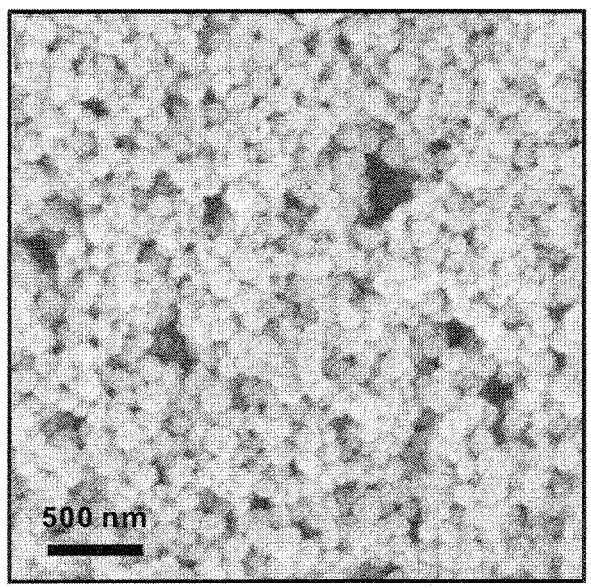
FIG. 24 is a TEM image of spherical superparticles made with 4-nm $SnO_2$ nanoparticles.

This $SnO_2$ nanoparticle-micelle aqueous solution was injected into a three-neck flask with a PVP ethylene glycol solution (2.0 mM, 5.0 mL) under vigorous stirring. The mixture solution was further stirred at room temperature for 10 minutes and then heated to 80° C. at 10° C./min under Ar flow. After aging at 80° C. for 6 hours, the solution was cooled to room temperature. The resulting colloidal superparticles were separated by centrifuge (500 g, 15 min). The black precipitate was re-dispersed into ethanol and the superparticles were further purified twice by centrifugation. The superparticles have a diameter of 170 nm with a standard deviation of 17% and a yield of 70%. (see FIG. 24)

Example 15

Synthesis of CdSe Nanocrystals

Trioctylphosphine oxide (TOPO, 7.75 mmol), Octadecylphosphonic acid (ODPA, 0.84 mmol) and CdO (0.47 mmol) were mixed in a 25-mL flask. After degassing under vacuum at ca. 150° C. for 1 hour, the vacuum was removed. Under argon flow, the solution was heated to 300° C. to dissolve CdO. Then, trioctylphosphine (TOP, 4.04 mmol) was added into the flask. After the resulting solution was heated to 370° C., a TOP solution with selenium (Se:0.73 mmol, and TOP; 0.97 mmol) was injected quickly into the solution, and reaction was quenched after 1 minute by cooling reaction solution to room temperature. The resulting nanocrystals were purified twice by precipitation/redispersion cycles using methanol and toluene. In a typical synthesis, the as-prepared CdSe nanocrystals have a diameter of 2.9 nm with a deviation of 4.3%. The 2.3-nm CdSe nanocrystals were synthesized with a reaction of 10 seconds, while the 3.5-nm. CdSe were made with a reaction time of 3 minutes.

Example 16

Synthesis of CdSe/CdS Nanorods

In a typical reaction, trioctylphosphine oxide (TOPO, 7.75 mmol), octadecylphosphonic acid (ODPA, 0.87 mmol), hexylphosphonic acid (HPA, 0.48 mmol) and CdO (0.7 mmol) were mixed in a 25-mL flask. After degassing under vacuum at ca. 150° C. for 1 hour, the vacuum was removed. Under argon flow, the solution was heated to above 300° C. to dissolve the CdO. Then, trioctylphosphine (TOP, 4.04 mmol) was added into the flask. After the resulting solution was heated to 350° C., a TOP solution with sulfur and CdSe nanocrystals (4.04 mmol of TOP, 3.75 mmol of S, and 0.4 mmol of 2.9-nm CdSe nanocrystals) was injected into the flask. The reaction was stopped after 8 minutes. The resulting nanorods were purified twice by precipitation/redispersion cycles using methanol and toluene. The obtained CdSe/CdS nanorods have a diameter of 3.7 nm and a length of 55 nm with a deviation of 3.5%.

The 100-nm-long and 33-nm-long CdSe/CdS nanorods were synthesized according to a similar procedure as above, but the size of the CdSe seed was changed to 2.3 nm and 3.5 nm, respectively.

Example 17

Synthesis of $TiO_2$ Nanoparticles

In a typical reaction, trioctylphosphine oxide (TOPO, 13.1 mmol) was degassed under vacuum at 150° C. for 10 minutes, and, titanium (IV) tetrabutoxide (TTB, 2.0 mmol) was added into the solution. After the resulting solution was heat to 320° C., $TiCl_4$ (2.5 mmol) was quickly injected into the flask. The reaction solution was keep at 320° C. for 2 hours with vigorous stirring. After the reaction solution was cooled to room temperature, the resulting nanoparticles were purified twice by precipitation/redispersion cycles using aceton and hexane. The as-prepared $TiO_2$ nanoparticles have a diameter of 11.7 nm with a deviation of 6.8%.

Example 18

Synthesis of $SnO_2$ Nanoparticles

In a typical reaction, trioctylphosphine oxide (TOPO, 13.1 mmol) and oleic acid (OA, 1 mmol) were mixed in a 25-mL flask. After degassed under vacuum at 150° C. for 10 minutes, Tin (IV) tetrabutoxide (TTB, 2.0 mmol) was added. Under argon flow, the solution was heat to 320° C. Then, $SnCl_4$ (2.5 mmol) was quickly injected into the flask. The reaction was kept at 320° C. for 1 hour with vigorous stirring. After reaction, the resulting nanoparticles were purified twice by precipitation/redispersion cycles using aceton and hexane. The obtained $SnO_2$ nanoparticles have a diameter of 4.4 nm with a deviation of 11.2%.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A colloidal superparticle (SP) of controlled shape and size, comprising an aggregate of nanoparticles, wherein the nanoparticles have a diameter of less than 100 nm and wherein adjacent nanoparticles are bound together through non-covalent interactions, wherein the SP comprises a superlattice structure and the SP is dispersible in a polar solvent.

2. The colloidal SP of claim 1, wherein the superlattice structure is a face-centered cubic (fcc) superlattice structure.

3. The colloidal SP of claim 1, wherein the SP comprises one type of nanoparticle.

4. The colloidal SP of claim 1, wherein the SP comprises two or more types of nanoparticle.

5. The colloidal SP of claim 1, wherein the nanoparticles are doped.

6. The colloidal SP of claim 1, wherein the SP comprises a dye inside or outside the nanoparticles.

7. The colloidal SP of claim 1, wherein the SP is synthesized by mixing a first solution comprising ligand-functionalized nanoparticles with a surfactant under aqueous conditions to form a second solution comprising nanoparticle-micelles; and mixing the second solution with a solvent to form a third solution comprising colloidal SPs.

8. The colloidal SP of claim 1, wherein the SP is spherical or partially spherical in shape.

9. The colloidal SP of claim 1, comprising one or more drugs or biologically active molecules.

10. The colloidal SP of claim 9, wherein the one or more drugs are analgesics, anesthetics, anti-inflammatory agents, anthelmintics, anti-arrhythmic agents, antiasthma agents, antibiotics, anticancer agents, anticoagulants, antidepressants, antidiabetic agents, antiepileptics, antihistamines, antitussives, antihypertensive agents, antimuscarinic agents, antimycobacterial agents, antineoplastic agents, antioxidant agents, antipyretics, immunosuppressants, immunostimulants, antithyroid agents, antiviral agents, anxiolytic sedatives, astringents, bacteriostatic agents, beta-adrenoceptor blocking agents, blood products and substitutes, bronchodilators, buffering agents, cardiac inotropic agents, chemotherapeutics, contrast media, corticosteroids, cough suppressants, diagnostic agents, diagnostic imaging agents, diuretics, dopaminergics, free radical scavenging agents, growth factors, haemostatics, immunological agents, lipid regulating agents, muscle relaxants, proteins, peptides and polypeptides, parasympathomimetics, parathyroid calcitonin and biphosphonates, prostaglandins, radio-pharmaceuticals, hormones, sex hormones, time release binders, anti-allergic agents, stimulants and anoretics, steroids, sympathomimetics, thyroid agents, vaccines, vasodilators, or xanthines.

11. The colloidal SP of claim 9, wherein the one or more biologically active molecules are chemotherapeutics, toxins, radiotherapeutics, radiosensitizing agents, gene therapy vectors, antisense nucleic acid constructs, transcription factor decoys, imaging agents, diagnostic agents, agents known to interact with an intracellular protein, polypeptides, or polynucleotides.

12. The colloidal SP of claim 1, wherein the SP is supercrystalline comprising a superlattice structure.

13. The colloidal SP of claim 1, wherein the nanoparticles are semiconductor nanoparticles, alloy semiconductor nanoparticles, doped semiconductor nanoparticles, core-shell semiconductor nanoparticles, metal nanoparticles, or metal oxide nanoparticles, or a combination of two or more semiconductor nanoparticles, alloy semiconductor nanoparticles, doped semiconductor nanoparticles, core-shell semiconductor nanoparticles, metal nanoparticles, or metal oxide nanoparticles.

14. The colloidal SP of claim 13, wherein the semiconductor nanoparticles comprise CdSe, CdS, CdTe, ZnS, ZnSe, ZnTe, HgS, HgSe, HgTe, PbS, PbSe, PbTe, InAs, InP, GaP, GaAs, FeS, CuS, Ag2S, or MnS nanoparticles.

15. The colloidal SP of claim 13, wherein the alloy semiconductor nanoparticles comprise CdZnS, CdZnSe, CdZnTe CdHgS, CdHgSe, CdHgTe, ZnSSe, CdSSe, HgSSe, CdSeTe, HgSeTe, InGaAs, or InGaP nanoparticles.

16. The colloidal SP of claim 13, wherein the core-shell semiconductor nanoparticles comprise CdS/ZnS, CdSe/ZnS, CdSe/CdS, CdSe/CdS/ZnS, PbSe/PbS, InAs/InP, InP/ZnS, or InP/CdS nanoparticles.

17. The colloidal SP of claim 13, wherein the doped semiconductor nanoparticles comprise Mn-doped ZnSe, Mn-doped CdS/ZnS, Mn-doped ZnSe/ZnS, or In-doped CdSe/ZnS nanoparticles.

18. The colloidal SP of claim 13, wherein the metal nanoparticles comprise Au, Ag, Cu, Pt, Cr, Pd, Fe, Co, Ni, Ru, W, Pt/Fe, Pt/Ni, Pt/Co, Ag/Au, or Cu/Ag nanoparticles.

19. The colloidal SP of claim 13, wherein the metal oxide nanoparticles comprise $Fe_2O_3$, $Fe_3O_4$, $FeMnO_3$, $Fe_2MnO_3$, NiO, MnO, $TiO_2$, $ZrO_2$, $MoO_3$, $WO_3$, $V_2O_5$, $CrO_3$, ZnO, $Al_2O_3$, $Ga_2O_3$, $In_2O_3$, SnO, $SiO_2$, $GeO_2$, or rare earth oxides nanoparticles.

20. The colloidal SP of claim 1, wherein the nanoparticles comprise $Fe_3O_4$ nanoparticles.

21. The colloidal SP of claim 20, wherein the $Fe_3O_4$ nanoparticles are about 5.8 nm or about 8.9 nm in diameter.

22. The colloidal SP of claim 20, wherein the $Fe_3O_4$ nanoparticles are oleic acid-functionalized.

23. The colloidal SP of claim 1, wherein the SP are between 0.02 micron and 1.0 micron in diameter.

24. The colloidal SP of claim 1, wherein the SP comprises nanoparticles of two or more different sizes.

25. The colloidal SP of claim 24, wherein the nanoparticles of two or more different sizes comprise $Fe_3O_4$ nanoparticles of about 5.8 nm and 8.9 nm in diameter.

26. An article of manufacture or a film or a stacked superparticle (SP) of controlled shape and size comprising a colloidal SP comprising an aggregate of nanoparticles, wherein the nanoparticles have a diameter of less than 100 nm and wherein adjacent nanoparticles are bound together through non-covalent interactions, wherein the SP comprises a superlattice structure and the SP is dispersible in a polar solvent.

27. The article of manufacture of claim 26, wherein the colloidal SP is provided as a coating on the article of manufacture.

28. The article of manufacture of claim 26, wherein the article of manufacture is a medical device, or an LED, or a solar cell, or a MRI contrast reagent, or a fluorescent label, or a gas sensor.

29. A pharmaceutical composition comprising a) a colloidal superparticle (SP) of controlled shape and size comprising an aggregate of nanoparticles, wherein the nanoparticles have a diameter of less than 100 nm and wherein adjacent nanoparticles are bound together through non-covalent interactions, wherein the SP comprises a superlattice structure and the SP is dispersible in a polar solvent, and b) a pharmaceutically acceptable carrier.

30. The pharmaceutical composition of claim 29, wherein the colloidal SP comprises one or more drugs or biologically active molecules.

31. The pharmaceutical composition of claim 30, wherein the one or more drugs are analgesics, anesthetics, anti-inflammatory agents, anthelmintics, anti-arrhythmic agents, antiasthma agents, antibiotics, anticancer agents, anticoagulants, antidepressants, antidiabetic agents, antiepileptics, antihistamines, antitussives, antihypertensive agents, antimuscarinic agents, antimycobacterial agents, antineoplastic agents, antioxidant agents, antipyretics, immunosuppressants, immunostimulants, antithyroid agents, antiviral agents, anxiolytic sedatives, astringents, bacteriostatic agents, beta-adrenoceptor blocking agents, blood products and substitutes, bronchodilators, buffering agents, cardiac inotropic agents, chemotherapeutics, contrast media, corticosteroids, cough suppressants, diagnostic agents, diagnostic imaging agents, diuretics, dopaminergics, free radical scavenging agents, growth factors, haemostatics, immunological agents, lipid regulating agents, muscle relaxants, proteins, peptides and polypeptides, parasympathomimetics, parathyroid calcitonin and biphosphonates, prostaglandins, radio-pharmaceuticals, hormones, sex hormones, time release binders, anti-allergic agents, stimulants and anoretics, steroids, sympathomimetics, thyroid agents, vaccines, vasodilators, or xanthines.

32. The pharmaceutical composition of claim 30, wherein the one or more biologically active molecules are chemotherapeutics, toxins, radiotherapeutics, radiosensitizing agents, gene therapy vectors, antisense nucleic acid constructs, transcription factor decoys, imaging agents, diagnostic agents, agents known to interact with an intracellular protein, polypeptides, or polynucleotides.

* * * * *